US007109625B1

(12) United States Patent
Jore et al.

(10) Patent No.: US 7,109,625 B1
(45) Date of Patent: Sep. 19, 2006

(54) CONDUCTOR OPTIMIZED AXIAL FIELD ROTARY ENERGY DEVICE

(76) Inventors: Lincoln M. Jore, 1000 Innovation Dr., Ronan, MT (US) 59864; Matthew B. Jore, 1000 Innovation Dr., Ronan, MT (US) 59864

( * ) Notice: Subject to any disclaimer, the term of this patent is extended or adjusted under 35 U.S.C. 154(b) by 0 days.

(21) Appl. No.: 10/543,752

(22) PCT Filed: Feb. 5, 2004

(86) PCT No.: PCT/US2004/003825

§ 371 (c)(1),
(2), (4) Date: Jul. 27, 2005

(87) PCT Pub. No.: WO2004/073365

PCT Pub. Date: Aug. 26, 2004

Related U.S. Application Data

(60) Provisional application No. 60/445,884, filed on Feb. 7, 2003.

(51) Int. Cl.
H02K 3/00 (2006.01)
H02K 3/04 (2006.01)
H02K 1/22 (2006.01)

(52) U.S. Cl. .................... 310/198; 310/68 R; 310/208; 310/268

(58) Field of Classification Search ............. 310/68 R, 310/71, 179, 184, 195, 198, 206–208, 268, 310/DIG. 6
See application file for complete search history.

(56) References Cited

U.S. PATENT DOCUMENTS

| 3,521,091 | A | * | 7/1970 | Halas .......................... 310/10 |
|---|---|---|---|---|
| 3,719,845 | A | * | 3/1973 | Takeda ........................ 310/268 |
| 3,845,339 | A | * | 10/1974 | Merkle et al. ......... 310/156.37 |
| 4,336,475 | A | * | 6/1982 | Morinaga et al. ........... 310/198 |
| 4,677,332 | A | * | 6/1987 | Heyraud ..................... 310/184 |
| 4,733,115 | A | * | 3/1988 | Barone et al. ............ 310/68 R |
| 4,794,293 | A | * | 12/1988 | Fujisaki et al. ............. 310/268 |
| 5,099,162 | A | * | 3/1992 | Sawada ....................... 505/166 |
| 5,637,945 | A | * | 6/1997 | Yamamuro et al. ......... 310/268 |
| 5,710,476 | A | * | 1/1998 | Ampela ...................... 310/268 |
| 2003/0020353 | A1 | * | 1/2003 | Lopatinsky et al. ........ 310/208 |
| 2006/0055265 | A1 | * | 3/2006 | Zalusky ................. 310/156.32 |

* cited by examiner

*Primary Examiner*—Tran Nguyen
(74) *Attorney, Agent, or Firm*—Richard C. Conover

(57) ABSTRACT

The present invention provides an axial rotary energy device which is arranged in a multi-phase electric current configuration. The device includes a rotor having a plurality of permanent magnet poles secured thereto and further includes a stator formed by stacking a plurality of printed circuit board working conductor layers together with a plurality of printed circuit board connecting layers. The stator having at least one working conductor layer for each phase of the electric current and at least one connecting conductor layer associated with one working conducting layer. The working conductor layer and the connecting conductor layer each having radial conductors extending from an inner diameter through-hole to an outer diameter through-hole. A plurality of via conductors are provided for electrically connecting selected ones of the radial connectors of the connecting conductor layer to selected ones of the radial connectors of the working conductor layers through the through-holes.

12 Claims, 26 Drawing Sheets

CONDUCTOR OPTIMIZED AXIAL FIELD ROTARY ENERGY DEVICE

This application claims the benefit of provisional application Ser. No. 60/445,884, filed Feb. 7, 2003.

BACKGROUND OF THE INVENTION

The present invention relates to an optimized axial field rotary energy device which can be either used as a motor for converting electrical energy to motion or a generator for converting rotary motion to electrical energy. This invention includes a stator formed by stacking a plurality of printed circuit boards wherein the electrical components are arranged for maximum power and efficiency.

Axial air gap brushless motors with layered disk stators are known, such as U.S. Pat. No. 5,789,841 to Wang. The stator winding in Wang utilizes wires interconnected in a wave or lap configuration. These motors were of relatively large size and difficult to manufacture.

Further, axial field electric machines utilizing printed circuit board stators are also known such as shown in U.S. Pat. No. 6,411,002 to Smith et al.

The present invention provides a rotary energy device for operating with multi-phase electrical power. The device is generally flat and relatively thin and provides a motor which can be used with many tools and appliances in use today, such as electric drills, power saws, weed eaters, electric bicycles, washers and dryers. The device according to the present invention is designed to minimize electrical resistance and to minimize eddy and loop current. The electromagnetic inductance is enhanced by minimizing the gap between the rotor magnets and the stator circuits and further since the motor is constructed of printed circuit boards, the manufacturing costs are substantially minimized.

SUMMARY OF INVENTION

The present invention provides an axial rotary energy device which is arranged in a multi-phase electric current configuration. The device includes a rotor having a plurality of permanent magnet poles secured thereto and further includes a stator formed by stacking a plurality of printed circuit board working conductor layers together with a plurality of printed circuit board connecting layers. The stator having at least one working conductor layer for each phase of the electric current and at least one connecting conductor layer associated with one working conductor layer. The working conductor layer and the connecting conductor layer each having radial conductors extending from an inner diameter through-hole to an outer diameter through-hole. A plurality of via conductors are provided for electrically connecting selected ones of the radial connectors of the connecting conductor layer to selected ones of the radial connectors of the working conductor layers through the through-holes.

DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

The present invention includes a stator formed by stacking a plurality of printed circuit boards (PCBs) containing a plurality of electrical circuits formed of a conductive material and supported by a nonconductive dielectric material. Overall, the invention is flat, relatively thin, and has a circular, square, or other shape suitable for the function of the device.

Figure 1:
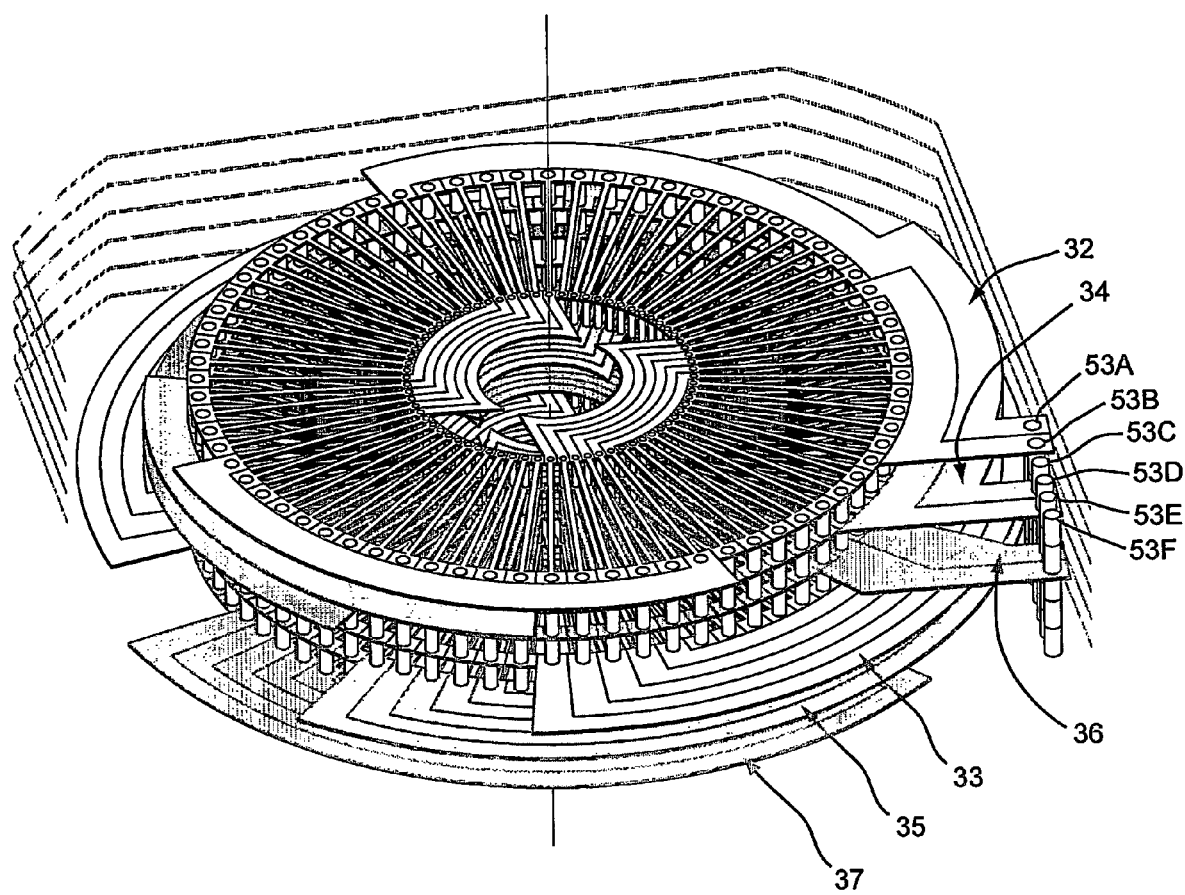
FIG. 1 is a partially exploded view of a stator, with parts broken away, used with the present invention.
Figure 2:
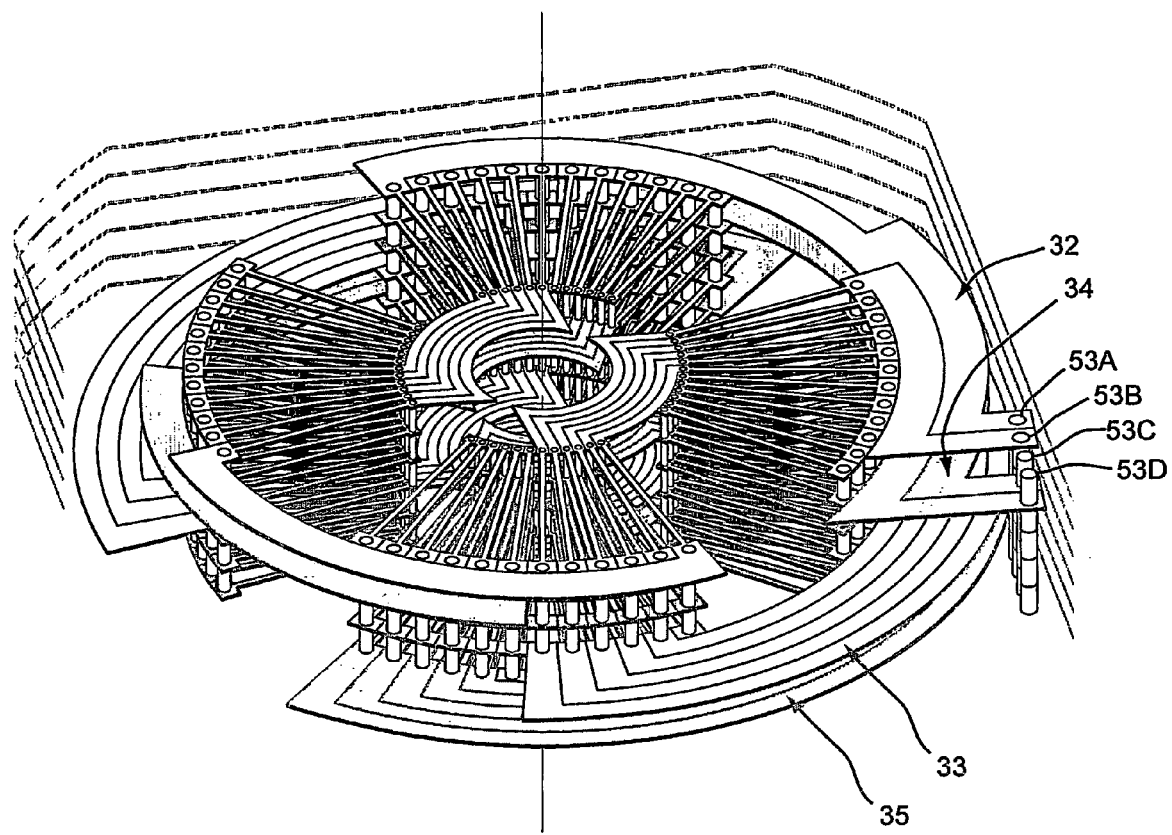
FIG. 2 is a view of the stator shown in FIG. 1 with further parts broken away.
Figure 3:
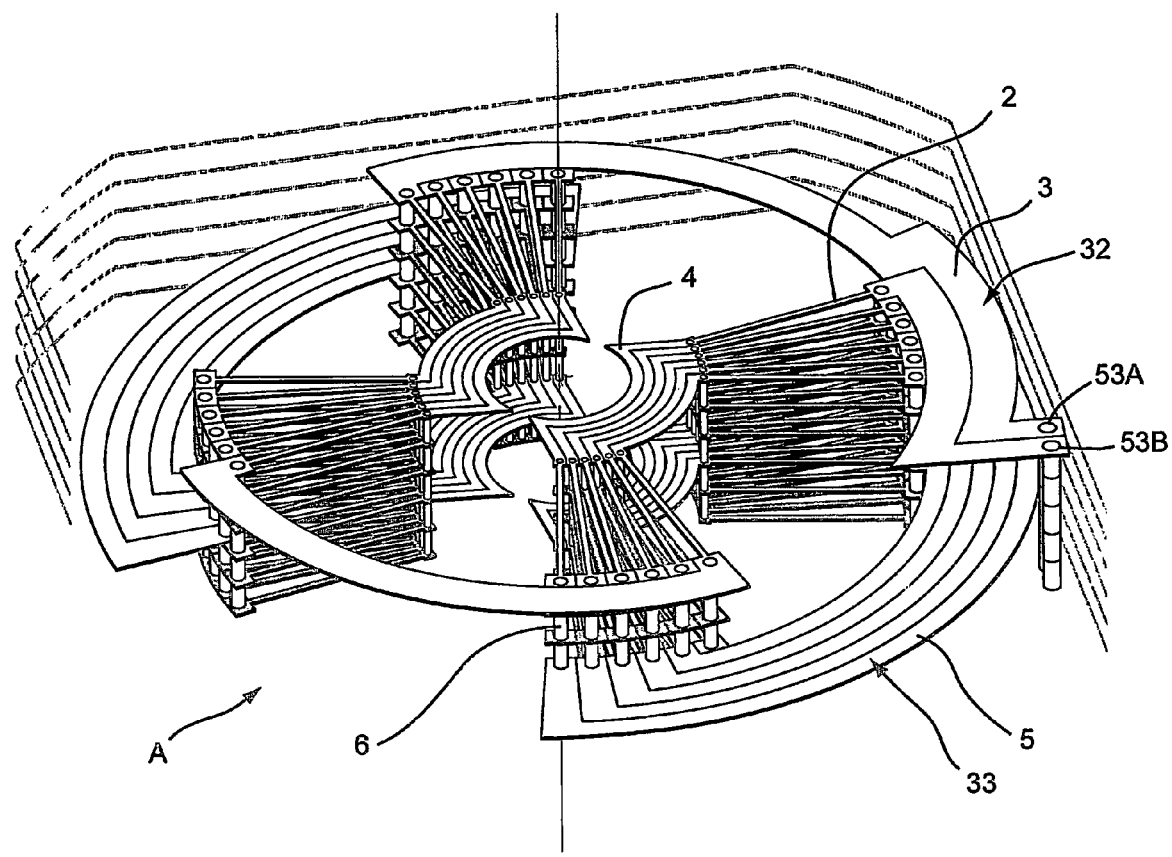
FIG. 3 is a view of the stator shown in FIG. 2 with further parts broken away.

As a non-limiting example, FIG. 1 shows a three-dimensional view of one preferred embodiment of the invention comprised of six PCB layers arranged in a three phase electrical current configuration. The three phases are denoted herein as A, B and C. In FIG. 1, the axial scale has been exaggerated for clarity and the nonconductive material normally present for electrical insulation and mechanical support has been removed. FIG. 1 illustrates one of many possible arrangements whereby a phase A circuit, a phase B circuit, and phase C circuit intermesh and bypass one another. In FIG. 2, the phase C circuit has been removed to so that some of the details are more easily seen. FIG. 2 illustrates one of many possible arrangements whereby a phase A circuit intermeshes and bypasses a phase B circuit. As best seen in FIG. 3 which has both phase B and C circuits removed, phase A circuit is comprised of layers of conductive material. Each layer of conductive material is comprised of a plurality of radial conductors, typified by a radial conductor 2, and a variety of non-radial conductors, as represented by non-radial conductors 3, 4, and 5. The radial conductors and non-radial conductors are connected together in series on the same conductor layer and are also connected in series with conductors on other conductor layers by a plurality of interlayer conductors, as represented by interlayer conductor 6. The interlayer conductors may also connect corresponding radial conductors on different layers of the conductive material in parallel. Phase A circuit, with numerous radial and non-radial conductors connected together on the same layer in series, or in series and in parallel, and interconnected between layers in series and in parallel, or in series, or in parallel, intermeshes and bypasses any other phase circuits contained within the same layers of conductive material. Phase circuits A, B, and C are illustrated in FIGS. 1–3 as being comprised of six layers of conductive material, but other embodiments of the invention may have a lower or a higher number of layers of conductive material.

As seen in FIGS. 1–3, and as described in detail below, the dimensions, spatial arrangements, and interconnections of each conductor within the phase A, B and C circuits are optimized based upon the function and desired performance of a device which would incorporate the invention. The dimensions, spatial arrangements, and interconnections of one conductor on one layer of conductive material can be varied independent of any other conductor in the same layer of conductive material. The dimensions, spatial arrangements, and interconnections of one conductor on one layer of conductive material can be varied independent of the dimensions, spatial arrangements, and interconnections of any other conductor on any other layer of conductive material. As one example, FIG. 3 shows radial conductor 2 having a width that is smaller than the width of non-radial conductor 3 even though they are connected to each other on the same layer of conductive material. By selectively manipulating the dimensions, spatial arrangements, and interconnections of each and every conductor within the phase A, B and C circuits, the device can be optimized for a number of factors, including but not limited to, electrical resistance, electromagnetic inductance, eddy and loop current generation, heat dissipation, and manufacturing cost. Preferred embodiments of the invention will now be described in detail to further illustrate the scope of the new invention.

Figure 4:
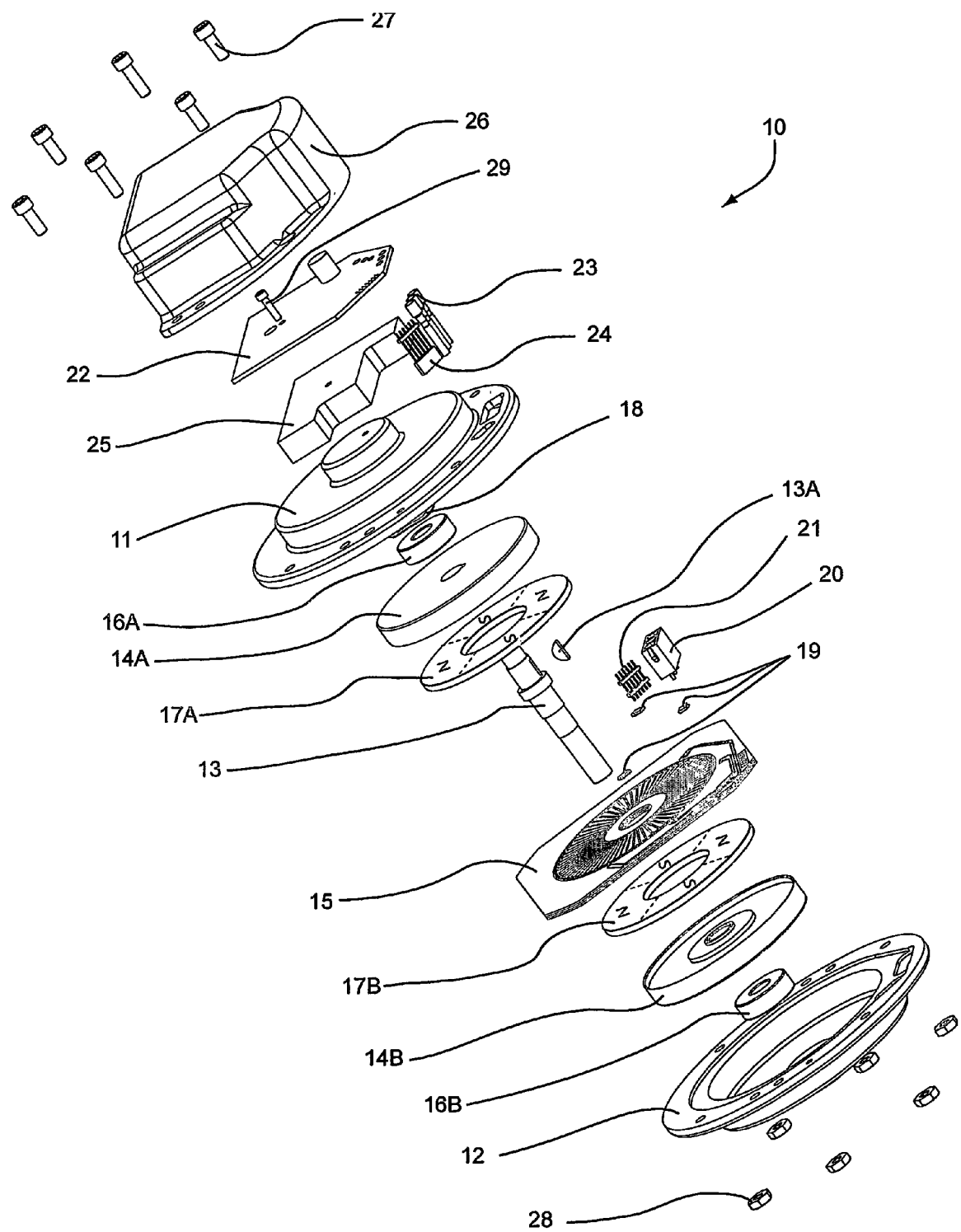
FIG. 4 is an exploded view of an energy device according to the present invention.

A preferred embodiment of the invention is shown in FIG. 4. A conductor optimized energy device 10 configured to function as a motor or a generator is comprised of two housings 11 and 12, a drive shaft 13, a shaft key 13a, two rotors 14a and 14b, a conductor optimized stator 15, two bearings 16a and 16b, two axially-magnetized permanent magnets 17a and 17b, a wavy washer 18, and three hall sensors 19. Device 10 is also comprised of a stator phase connector 20, a stator sensor connector 21, an electronic control board 22, a control phase connector 23, a control sensor connector 24, a control heat sink 25, and control cover 26. Electronic control board 22 provides an electronic sensing and control means for appropriately delivering an electric current to conductor optimized stator 15. Electronic control board 22 is connected to a dc power source such as a battery or a dc power supply (not shown). Electronic control board 22 is also known in the art as a motor drive and utilizes the conventional types of components normally present such as integrated circuit chips, power transistors, regulators, diodes, resistors and capacitors.

Stator phase connector 20 interfaces with control phase connector 23 and stator sensor connector 21 interfaces with control sensor connector 24 to connect electronic control board 22 to conductor optimized stator 15. Also shown are bolts 27 and nuts 28 that fasten housing 11, housing 12, and control cover 26 together. A control mounting bolt 29 fastens electronic control board 22 and control heat sink 25 to housing 11.

Figure 5:
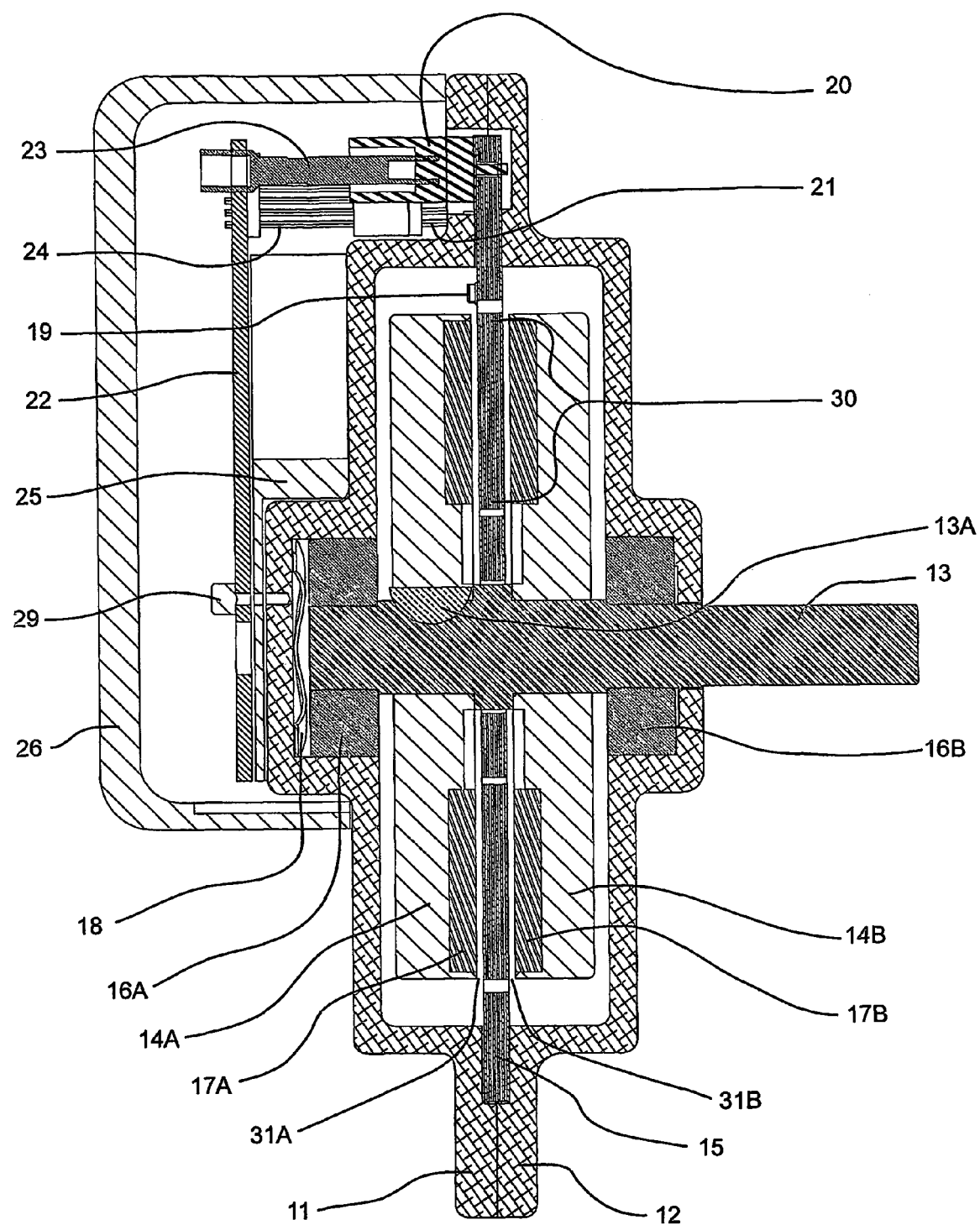
FIG. 5 is a cross-sectional view of an energy device according to the present invention.

Still referring to FIG. 4, magnets 17a and 17b are magnetized axially and have poles N and S that alternate around the ring. Magnets 17a and 17b are shown and described as ring magnets but may also be made of individual segments. Magnets 17a and 17b are preferably comprised of at least one rare earth metal such as an alloy of neodymium, iron, and boron. When assembled within device 10 as shown in FIG. 5, magnets 17a and 17b are attached to rotors 14a and 14b. The rotors 14a and 14b are fixedly secured to drive shaft 13 on opposite sides of the stator 15 with the magnets 17a and 17b positioned so that a N pole on magnet 17a faces a S pole on magnet 17b. Magnets 17a and 17b produce a magnetic flux between them that is perpendicular to the surface of the conductor optimized stator 15. Magnets 17a and 17b are shown and described as having four magnetic poles however device 10 may be configured with magnets comprised of other numbers of poles such as two, six, eight, sixteen, or any other even number that may be feasible to manufacture.

In FIG. 5, housings 11 and 12, comprised of a rigid material such as a molded plastic, or an alloy comprised of aluminum or magnesium, support bearings 16a and 16b. The drive shaft 13 is supported by the two bearings 16a and 16b and drive shaft 13 protrudes through an opening in housing 12. Rotors 14a and 14b with attached magnets 17a and 17b are attached to shaft 13. Rotors 14a and 14b are made of a magnetically permeable material such as steel in order to provide a flux return for magnets 17a and 17b. Magnets 17a and 17b produce a concentrated magnetic flux between them. Housings 11 and 12 hold conductor optimized stator 15 in position between rotors 14a and 14b and across air gaps 31a and 31b from magnets 17a and 17b. The portion of conductor optimized stator 15 that is within the concentrated magnetic flux between magnets 17a and 17b defines a working section 30. The rotation by an external means of magnets 17a and 17b will induce an electrical current within the conductive material of working section 30 that when properly gathered and delivered allows device 10 to behave as a generator or alternator. Conversely, the proper application of an electrical current to the conductive material of the working section 30 will produce Lorentz forces between the flowing current and the magnetic field. The resultant force is a torque that rotates magnets 17a and 17b that are fixedly attached to rotors 14a and 14b that are fixedly attached to drive shaft 13. Drive shaft 13 is available to do work and so device 10 can behave as a motor or actuator.

Figure 6:
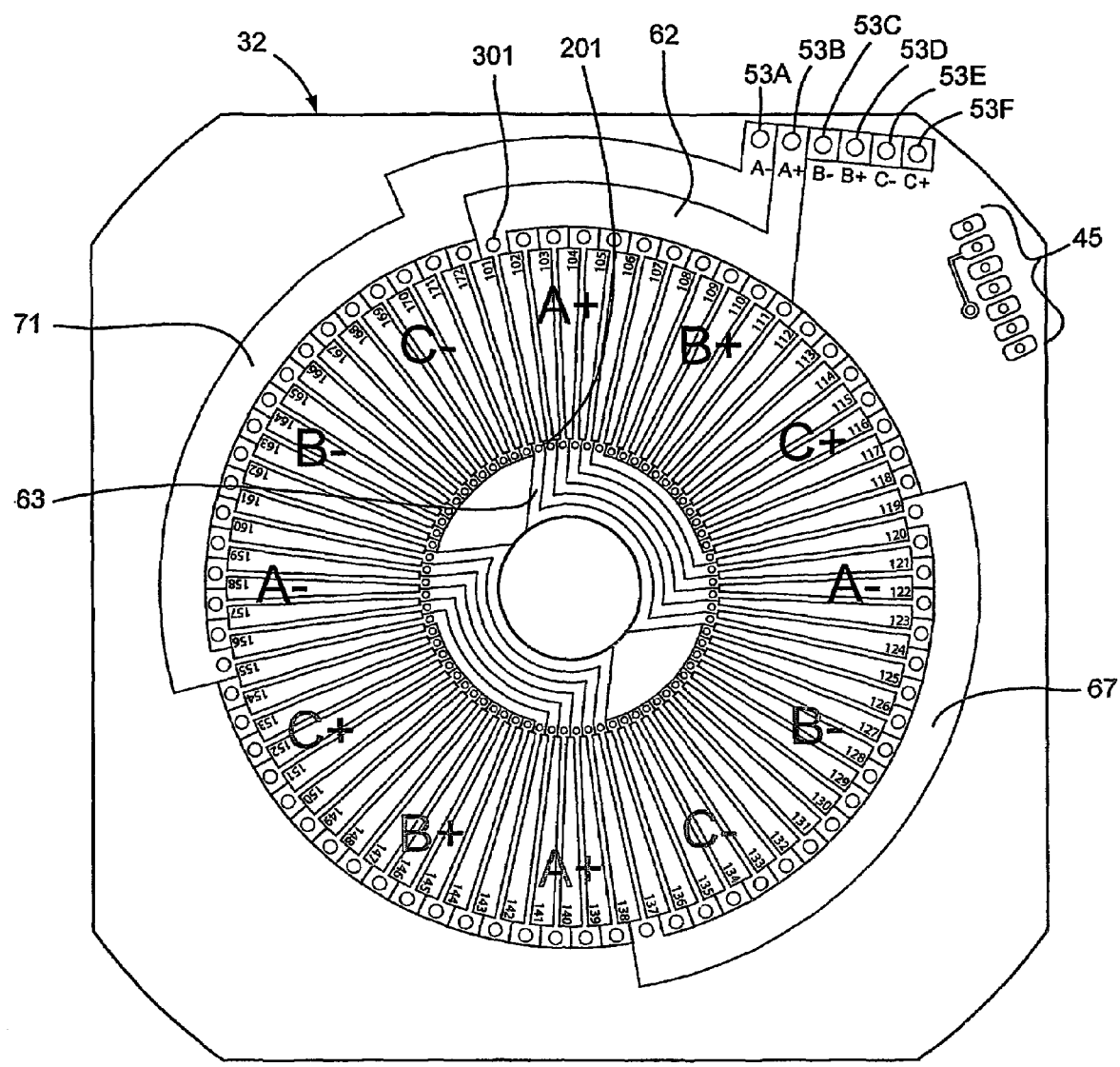
FIG. 6 is a plan view of a first working conductor layer used with the stator shown in FIG. 1.
Figure 13A:
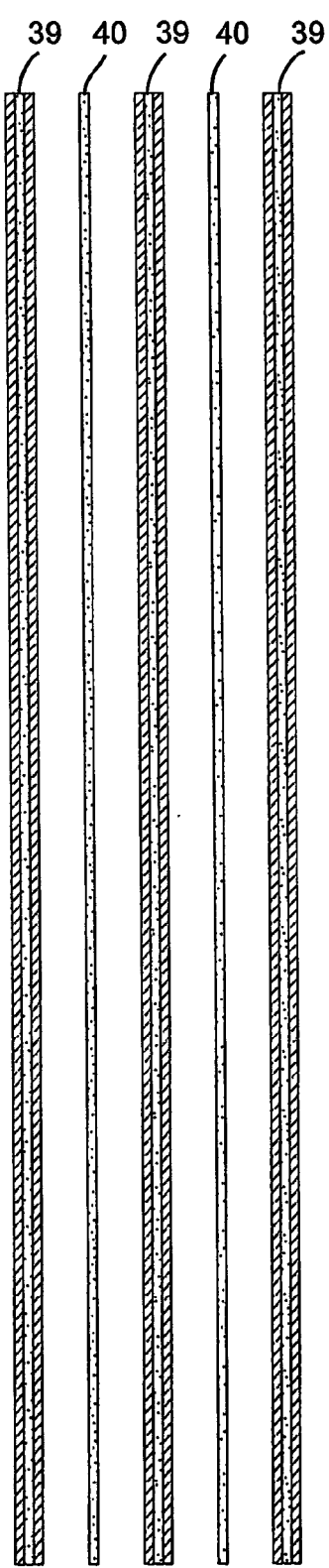
FIG. 13A is an exploded cross-sectional view showing a method of construction in the stator layers.
Figure 13B:
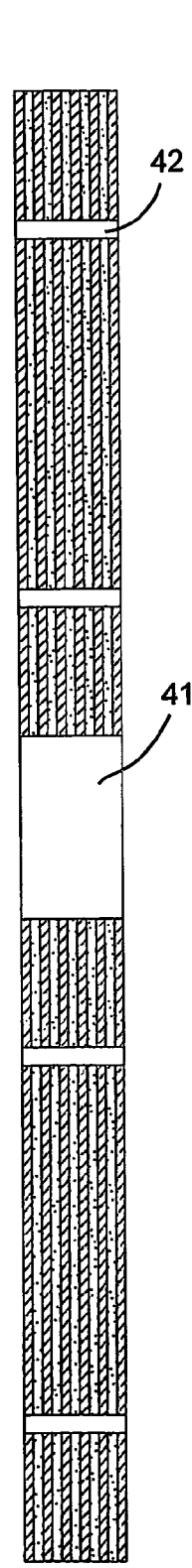
FIG. 13B is a cross-sectional view showing the stacked stator layers shown in FIG. 13A.
Figure 13C:
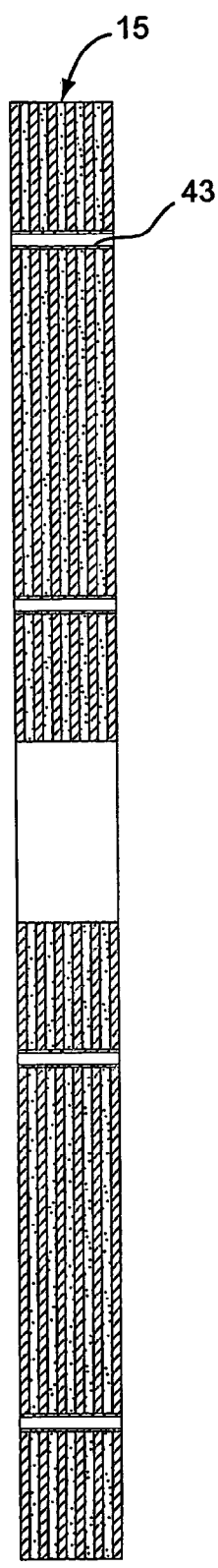
FIG. 13C is a cross-sectional view as shown in FIG. 13B with plated through-holes.

In accordance with a preferred embodiment of the present invention, the novel features of conductor optimized rotary energy device 10 will now be described. Conductor optimized stator 15 of device 10 is comprised of stacked PCB layers of a conductive material supported by multiple layers of a nonconductive material. FIGS. 6–11 each illustrate a conductor pattern for a layer of conductive material within conductor optimized stator 15. FIG. 6 shows a layer of the conductive material within conductor optimized stator 15 having a "working" PCB pattern 32. Each layer of conductive material is supported by a layer of nonconductive material that separates it from other layers of conductive material. Each layer of conductive material within conductor optimized stator 15 may have an identical or a different PCB pattern. The patterns for each layer represent electrical conductors comprised of an electrically conductive material, such as copper, electrically insulated and mechanically supported by a nonconductive material, such as fiberglass. The conductor patterns of each layer may be produced by various methods including, but not limited to, etching, stamping, spraying, cutting, or machining. A preferred method is to chemically etch conductor patterns, such as conductor pattern 32, into each side of a plurality of two-sided circuit boards 39, comprised of one sheet of fiberglass sandwiched between two sheets of copper. As a non-limiting example, FIGS. 13A–13C diagrammatically show how conductor optimized stator 15 may be manufactured. In FIG. 13A, three two-sided circuit boards 39 are stacked together with two fiberglass sheets 40 between them. In FIG. 13B, the stacked circuit boards 39 and fiberglass sheets 40 are laminated together using heat and pressure to form a multiple board arrangement for conductor optimized stator 15. A center hole 41 is made for shaft 13 to pass through. A plurality of holes 42 are drilled and, as shown in FIG. 13C, holes 42 may be plated with a conductive material such as copper to form a plurality of plated holes typified in FIG. 13C by plated hole 43.

It is preferred to use circuit boards that have copper sheets that are thicker than the copper sheets used in most commonly produced circuit boards. Copper sheet thicknesses ranging from 0.004 inches to 0.007 inches are preferred but other thickness of copper sheet may be used. As previously shown in FIG. 1, copper sheet thickness in the preferred range produce conductors that are ribbon-shaped when viewed without the supporting fiberglass. Referring again to FIG. 6, holes are drilled in precise locations through the multiple circuit boards of conductor optimized stator 15 and then the inner walls of the holes are plated with a conductive material such as copper. The plated holes, also known as vias, provide a plurality of interlayer conductors, typified by vias 201 and 301 that electrically connect the conductors on different layers of conductor optimized stator 15. Although plated holes are shown and described in the current embodiment, is should be understood that other interlayer conductor means are possible, including but not limited to, holes filled with conductive material, metal pins, crimp points, spot welds, or wire. As previously stated, the various conductors on the different layers of conductor optimized stator 15, connected together in series and in parallel by the vias, comprise the optimized conductor circuits of the invention. Present day circuit board manufacturing techniques are able to provide quantities of conductor optimized stators 15 with relatively small variances for conductor dimensions, spatial arrangement, stator thickness, and stator flatness, as well as a one hundred percent assurance of continuity for the conductor circuits.

Figure 7:
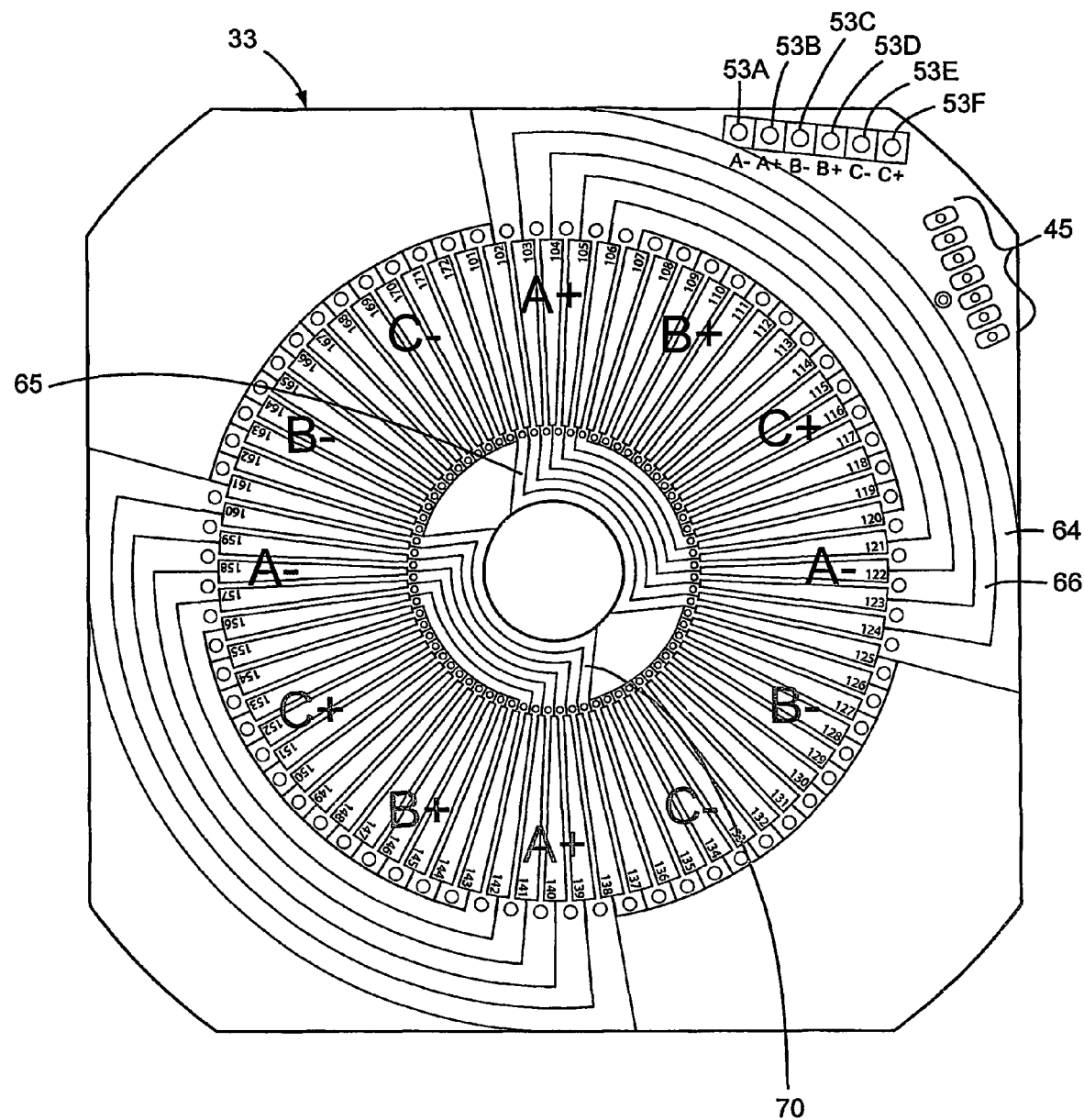
FIG. 7 is a plan view of a first connecting conductor layer used with the stator shown in FIG. 1.
Figure 8:
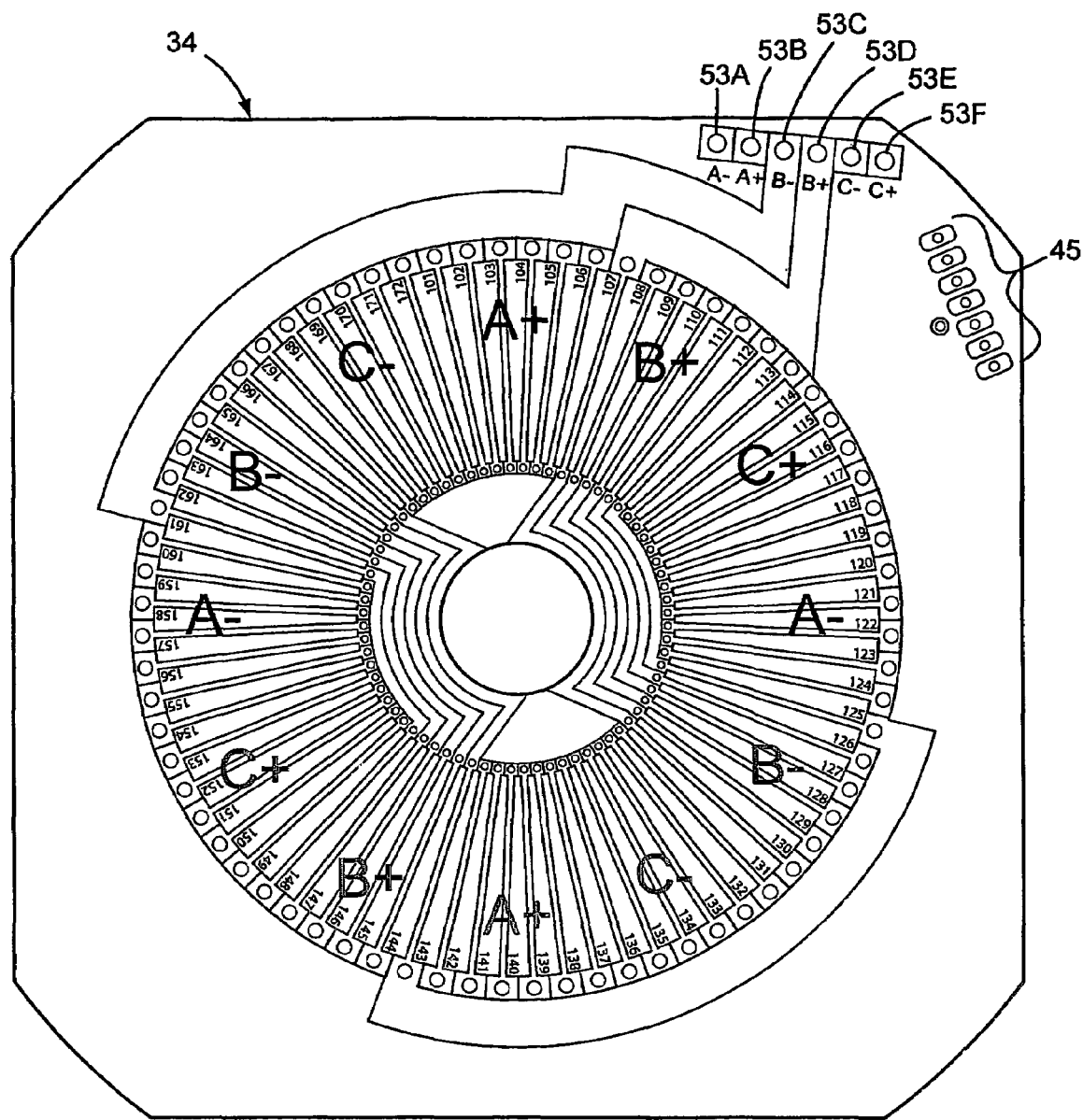
FIG. 8 is a plan view of a second working conductor layer used within the stator shown in FIG. 1.
Figure 9:
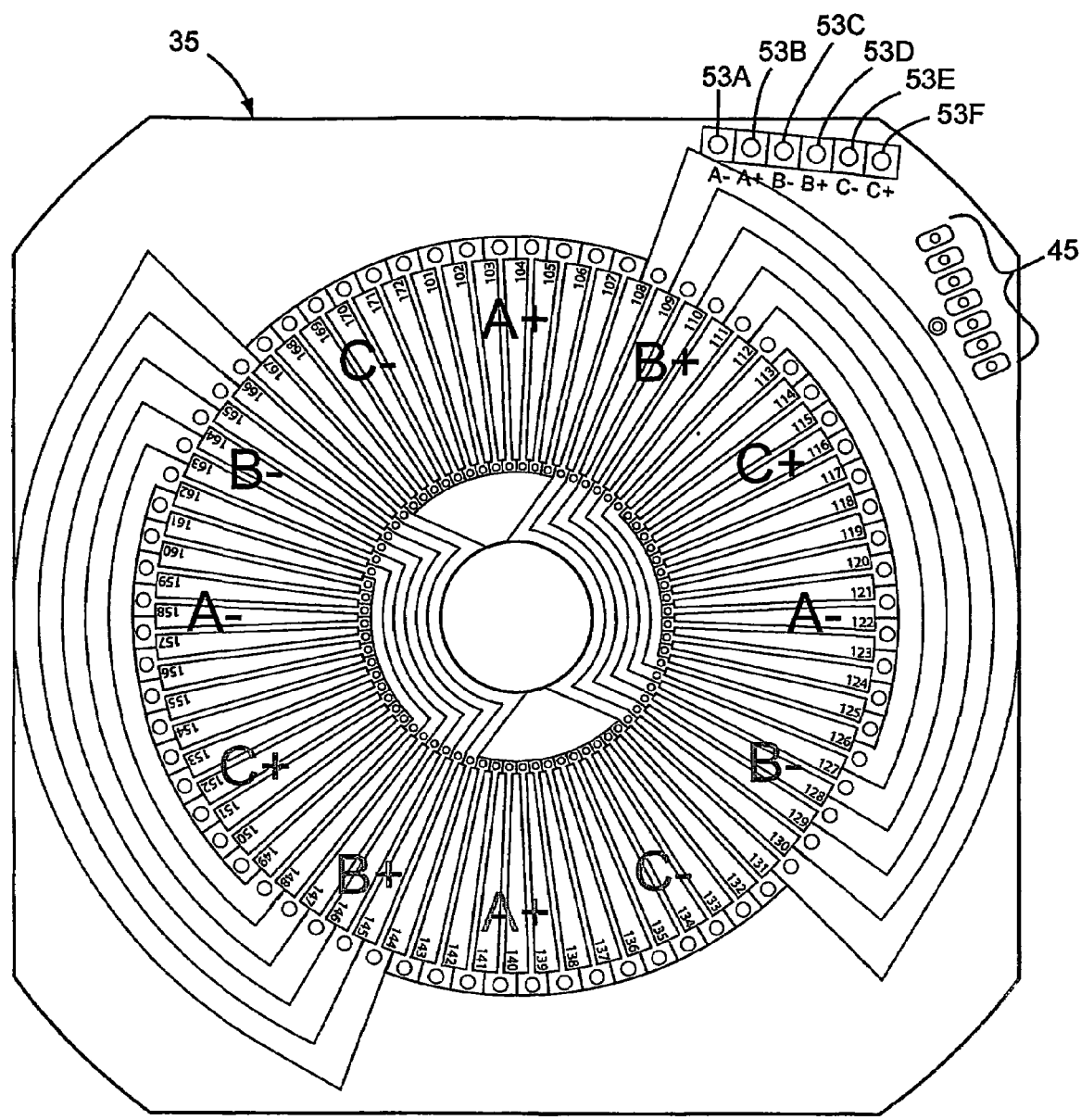
FIG. 9 is a plan view of a second connecting conductor layer used within the stator shown in FIG. 1.
Figure 10:
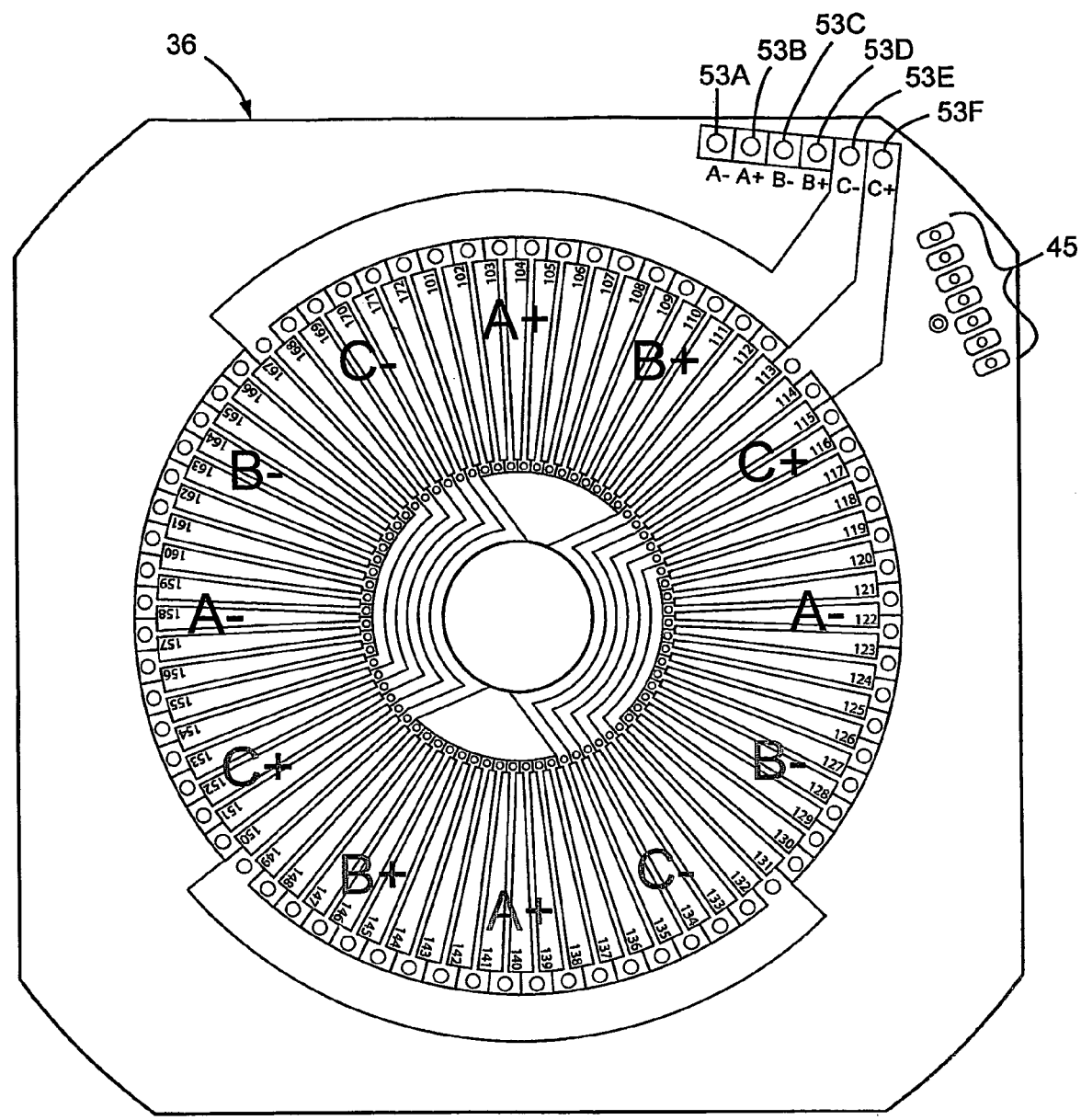
FIG. 10 is a plan view of a third working conductor layer used within the stator shown in FIG. 1.
Figure 11:
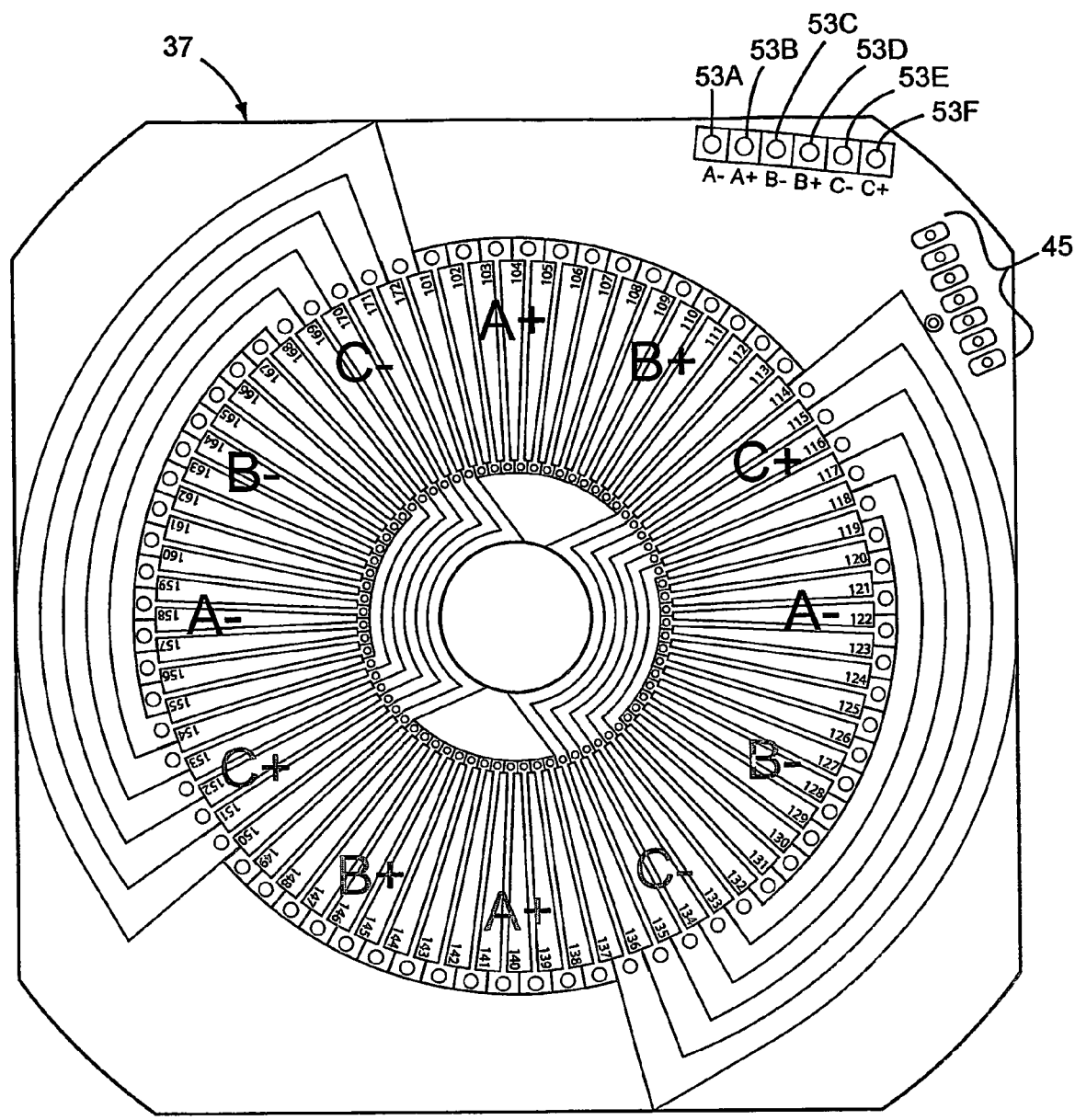
FIG. 11 is a plan view of a third connecting conductor layer used with the stator shown in FIG. 1.

In the currently described preferred embodiment shown in FIGS. 4–11, there are three optimized conductor circuits, one for each electrical power phase of a three phase power circuit, in conductor optimized stator 15. As previously described, FIG. 6 shows a layer of conductive material within conductor optimized stator 15 comprised of a working PCB pattern 32. FIG. 7 illustrates a layer of conductive material within conductor optimized stator 15 comprised of a connecting PCB pattern 33. PCB pattern 32 of FIG. 6 and PCB pattern 33 of FIG. 7 are comprised of conductors connected together in order to electrically complete a portion of the phase A circuit. PCB patterns 32 and 33 are also comprised of conductors associated with phase B and C circuits. Similarly, a working PCB pattern 34 shown in FIG. 8 and a connecting PCB pattern 35 shown in FIG. 9 are comprised of conductors connected together in order to electrically complete a portion of the phase B circuit. PCB patterns 34 and 35 are also comprised of conductors associated with the phase A and C circuits. Also, a working PCB pattern 36 shown in FIG. 10 and a connecting PCB pattern 37 shown in FIG. 11 are comprised of conductors connected together in order to electrically complete the phase C circuit. PCB patterns 36 and 37 are also comprised of conductors associated with the phase A and B circuits.

The pattern of radial conductors in PCB patterns 32, 33, 34, 35, 36 and 37 are identical in all layers.

Figure 12:
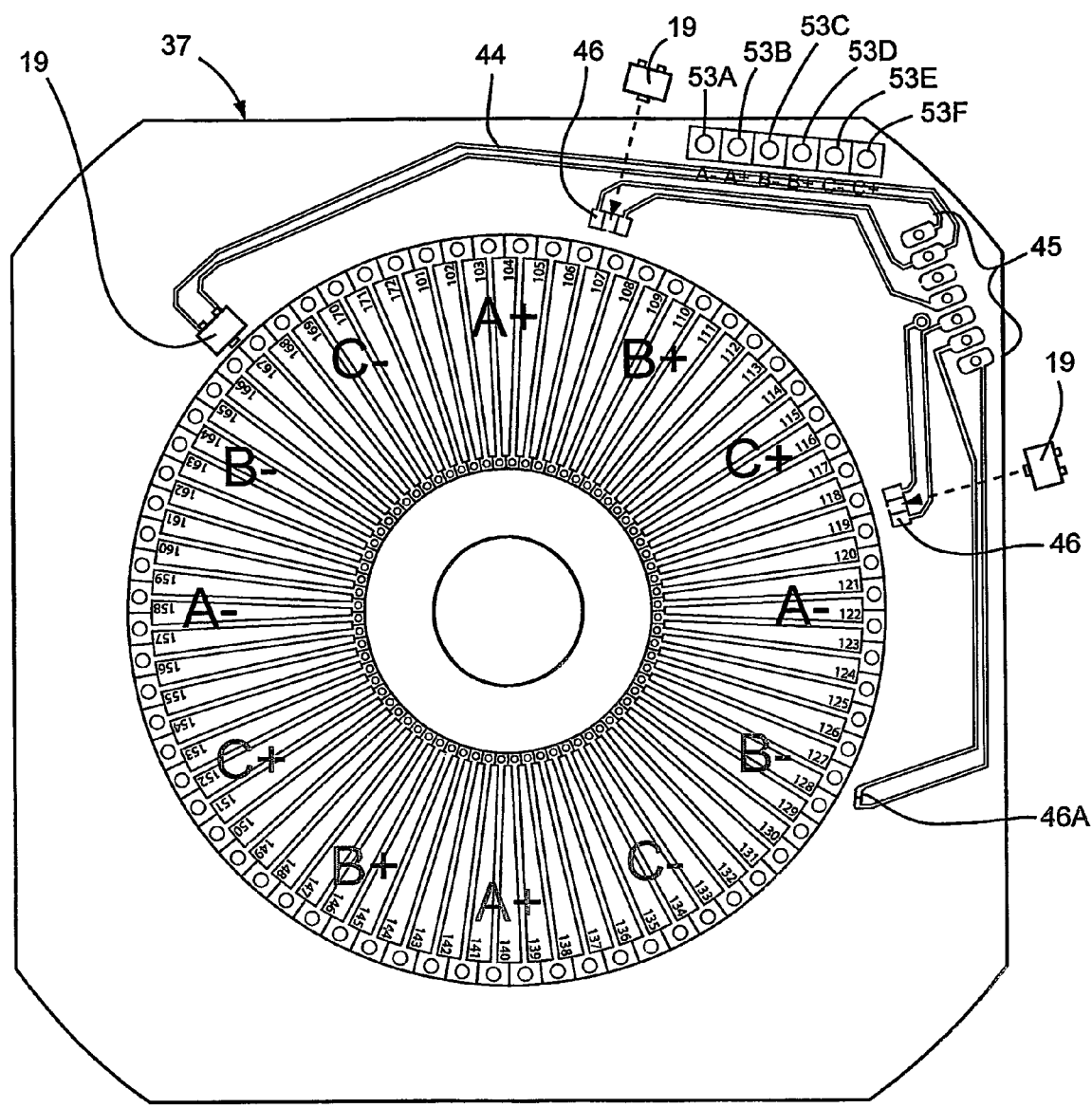
FIG. 12 is a plan view of a separate conductor layer used within the stator according to the present invention.
Figure 25:
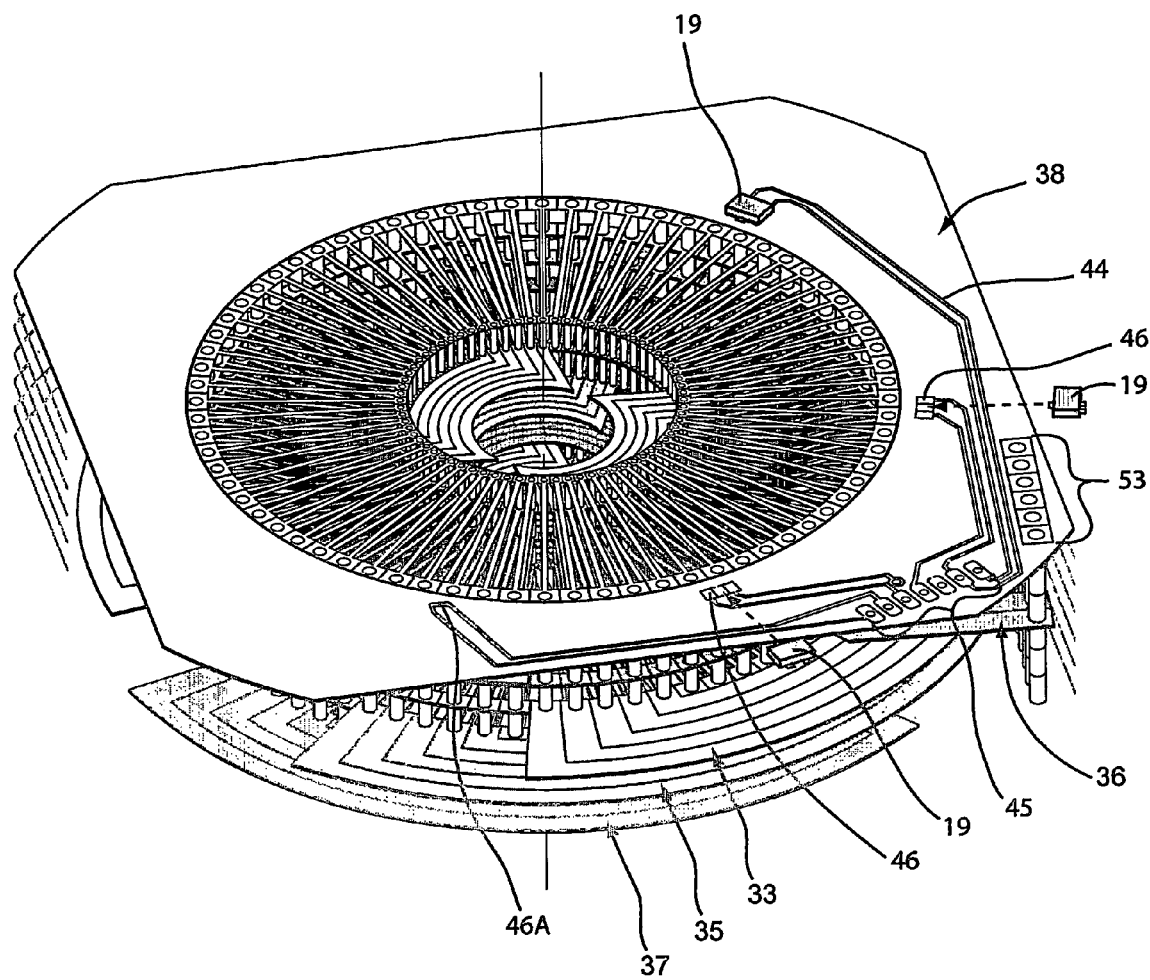
FIG. 25 is a partially exploded view of the stator shown in FIG. 1 with the separate conductor layer shown in FIG. 12.

FIG. 12 shows a PCB layer of conductive material having a PCB pattern 38 of radial conductors identical to the patterns of radial conductors in the other PCB layers. PCB pattern 38 further includes a plurality of conductors 44 that connect a plurality of sensor terminals 45 to a plurality of sensor mounting pads 46. Sensor mounting pads 46 provide for the surface mounting of a means to detect the position of the magnetic poles N and S of magnets 17a and 17b, such as an array of Hall sensors. One Hall sensor 19 is shown mounted to one sensor mounting pad 46. Sensor mounting pad 46A provides for the surface mounting of a temperature sensing means such as a thermistor. Sensor terminals 45 provide a connection means to an external electronic control means such as a motor drive. PCB pattern 38 is also comprised of conductors associated with the phase A, B and C circuits. FIG. 25 shows PCB pattern 38 on top of the stacked PCB patterns 32, 33, 34, 35, 36 and 37 previously shown in FIG. 1. PCB pattern 38 is preferably a top or a bottom layer in order to facilitate the surface mounting of sensors and connectors, such as Hall sensors 19 to sensor mounting pads 46, stator phase connector 20 to phase terminals 53, and stator sensor connector 21 to sensor terminals 45. Radial conductors I PCB pattern 38 are electrically connected with via conductors to phase circuits A, B and C of PCB patterns 32, 33, 34, 35, 36 and 37.

Figure 6A:
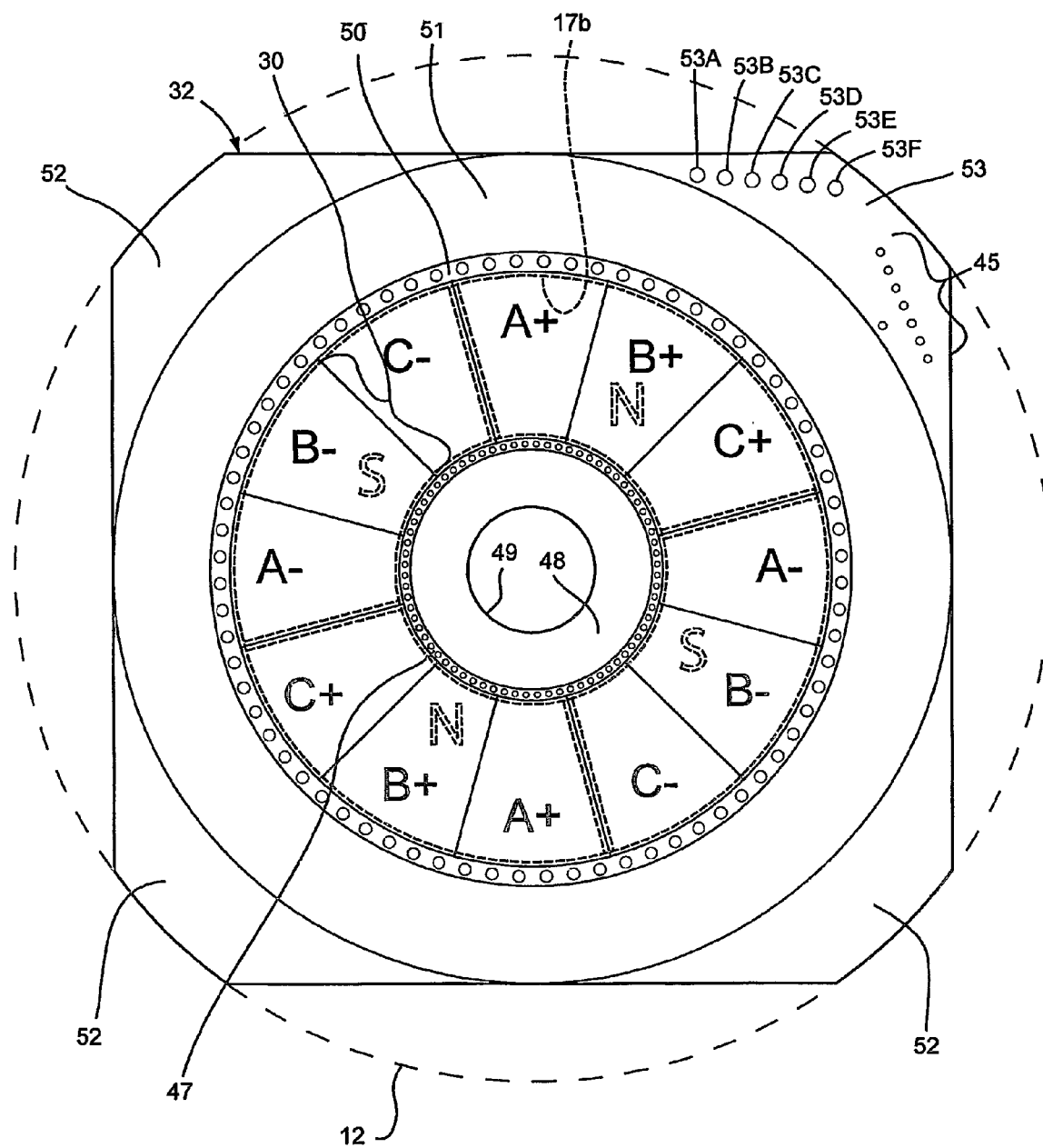
FIG. 6A is a plan view of the first working conductor layer shown in FIG. 6 with details of the conductor pattern removed.

Referring now to FIG. 6A, PCB pattern 32 is comprised of a plurality of concentric ring-shaped sections differentiated by the function of the conductors that they contain. FIG. 6A illustrates the various functional ring-shaped sections of the PCB pattern 32 with some of the detail of the PCB pattern 32 removed for clarity. The following description of the functional ring-shaped sections of PCB pattern 32 shall apply to each PCB pattern on each layer of conductive material within conductor optimized stator 15. Also shown in FIG. 6A is magnet 17b with magnetic poles N and S. Magnet 17b is positioned behind conductor optimized stator 15 as drawn in FIG. 6A and magnet 17a, not shown, is in the same location but positioned above conductor optimized stator 15. PCB pattern 32 has a working conductor section 30 that is defined by the magnetic poles N and S of magnet 17a. In other words, the working conductor section 30 is the portion of conductor optimized stator 15 that is intersected by the magnetic flux between magnets 17a and 17b. As shown in FIG. 6A, there is a plurality of phase sectors of the working conductor section 30 that are designated A, B, and C. The total number of phase sectors is equal to the number of magnetic poles multiplied by the number of electrical phases being utilized. In the currently described embodiment, device 10 utilizes a three phase configuration and four magnetic poles and therefore working conductor section 30 has a total of twelve phase sectors. Device 10 may also be configured for use with other multi phase configurations that would change the number of phase sectors. As a nonlimiting example, another embodiment of device 10 utilizing a five phase configuration and four magnetic poles will have a working conductor section 30 divided into twenty phase sectors. As illustrated in FIG. 6A, the arrangement of the phase sectors A, B, and C is sequential around the working conductor section 30 and the combined area of three phase sectors is equal to the area of one magnetic pole.

Still referring to FIG. 6A, other sections of PCB pattern 32 will be described. Radially inward of working conductor section 30 is an inner via section 47. Radially inward of inner via section is an inner non-radial conductor section 48. Radially inward of inner non-radial conductor section 48 is a shaft hole 49. Radially outward of the working conductor section 30 is an outer via section 50. Radially outward of outer via section 50 is an outer non-radial conductor section 51. Radially outward of outer non-radial conductor section 51 is a heat sink section 52. Heat sink section 52 contacts housings 11 and 12 to provide a means to transfer heat from conductor optimized stator 15 to the housings 11 and 12. One area of heat sink section 52 is designated as a terminal section 53 which provides a connection means to an external electrical system such as a motor drive, a rectifier, or a converter.

PCB pattern 32 of conductor optimized stator 15 is shown having six concentric ring-shaped sections but other embodiments of the invention with a lower or a higher number of concentric ring-shaped sections are possible.

The terminal section 53 includes terminals 53A, 53B, 53C, 53D, 53E and 53F, two terminals for each phase of the electrical power circuit. Each of the stacked layers have these terminals connected together with via connectors as shown in FIG. 1. Working conductor layer 32 is connected to terminals 53A, 53B. Working conductor layer 34 is connected to terminals 53C and 53D. Working conductor layer 36 is connected to terminals 53E and 53F.

As seen in FIGS. 6–11, the size and shape of a first conductor in a first section of PCB pattern 32 is usually different than the size and shape of a second conductor in a second section of PCB pattern 32. Also, the size, shape and location of a conductor in a first section of a first pattern on a first layer of conductor optimized stator 15 may either be the same or different than a conductor in a corresponding first section of a second pattern of a second layer of conductor optimized stator 15. This is in contrast to the conductors in conventional motors and generators that are wound with a fixed diameter wire which dictates that the conductors are of a constant size and shape throughout the motor or generator.

Figure 14:
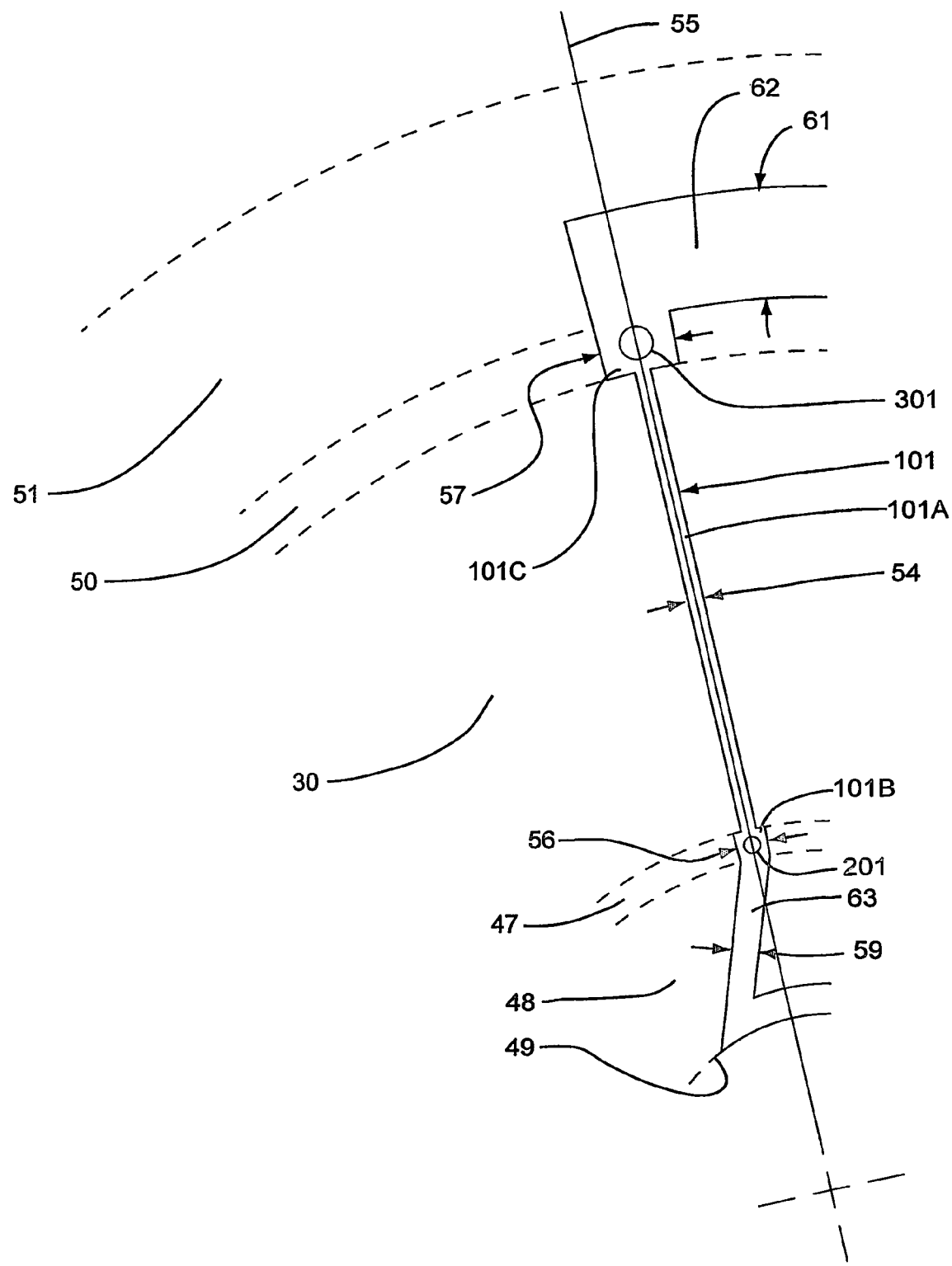
FIG. 14 is a detail view of a radial conductor used with the conductor layers according to a first embodiment of the present invention.

The configuration of the conductive material in each section of the PCB pattern 32 depends upon what functional role each section plays for conductor optimized stator 15. As previously shown and described, phase sectors A, B, and C are within the flux field between magnets 17a and 17b. Referring now to FIG. 14, a portion of PCB pattern 32 is illustrated with portions of working conductor section 30, inner via section 47, inner non-radial conductor section 48, shaft hole 49, outer via section 50, and outer non-radial conductor section 51. As an example of how a conductor is optimized in different sections of the PCB pattern 32, a radial conductor 101 and some associated non-radial conductors will be described in detail. In the currently described embodiment, radial conductor 101 is comprised of a working conductor 101a that has a width 54 that is constant within working conductor section 30 and width 54 is symmetrical along a radius 55. Radial conductor 101 is also comprised of an inner pad 101b within inner via section 47 that has a width 56 and an outer pad 101c within outer via section 50 that has a width 57. Width 54 is less than or equal to width 56. Width 54 is less than width 57. Since width 54 lies in a plane normal to the magnetic flux, increasing width 54 will result in an increase in eddy currents in working conductor 101a. Eddy currents produce forces that oppose the rotation of magnets 17a and 17b, robbing device 10 of power when device 10 is performing as either a generator or a motor. The speed of the rotation of magnets 17a and 17b is one factor used to determine width 54. A faster speed of rotation produces more eddy currents and so an embodiment of device 10 configured to rotate at a high speed will have a value of width 54 that is less than a value of width 54 in an embodiment of device 10 that is configured to rotate at a low speed. Electrical resistance is another factor that is used to determine a value of width 54. Electrical resistance robs device 10 of power when device 10 is performing as either a generator or a motor. Electrical resistance produces heat as electrical current flows through the conductive material of optimized stator 15 and electrical resistance increases as the temperature of the conductive material increases. Electrical resistance increases as width 54 is decreased. So in order to reduce the losses attributed to electrical resistance, a maximum value of width 54 can be selected. However, depending upon the operating speed of device 10, a maximum value of width 54 may result in substantial losses due to eddy currents. Therefore, a value of width 54 of working conductor 101a is selected that balances eddy current losses with electrical resistance losses.

Referring to FIGS. 6 and 14, pad 101b is within inner via section 47. Inner via 201 electrically connects inner pad 101b of radial conductor 101 to corresponding radial conductors on other layers of conductive material within conductor optimized stator 15. Inner pad 101b is continuous with an inner non-radial conductor 58 that has a width 59. Width 59 of inner non-radial conductor 58 is preferably greater than or equal to width 56 of inner pad 101b of radial conductor 101. Outer pad 101c has outer via 301 that connects pad 101c of radial conductor 101 to corresponding radial conductors on other layers of conductive material within conductor optimized stator 15. Outer pad 101c is continuous with an outer non-radial conductor 62 that has a width 61. Width 61 is preferably greater than or equal to width 57. In FIG. 14, inner pad 101b is shown to be continuous with an inner non-radial conductor 63 and outer pad 101c is shown to be continuous with an outer non-radial conductor 62. However, in the currently described embodiment, inner pad 101b of radial conductor 101 is only connected to an inner non-radial conductor 63 in PCB pattern 32, shown in FIG. 6 and inner non-radial conductor 65 in PCB pattern 33, shown in FIG. 7. The outer pad 101c is only connected to an outer non-radial conductor 62 in PCB pattern 32, shown in FIG. 6. Radial conductor 101 of PCB patterns 34, 35, 36, and 37, shown in FIGS. 8, 9, 10, and 11 respectively, are not shown to be connected to an inner non-radial conductor or an outer non-radial conductor. It should be understood that radial conductor 101 may be selectively connected to inner non-radial conductor 63 or to an outer non-radial conductor 62 on any layer of conductive material within conductor optimized stator 15.

Referring again to FIG. 14, inner pad 101b and outer pad 101c of radial conductor 101, inner non-radial conductor 63, and outer non-radial conductor 62 are not subjected to the concentrated magnetic field of magnets 17a and 17b. Therefore, eddy currents are not a factor and widths 56, 57, 59, and 61 are made as large as possible within their respective sections of conductor optimized stator 15 in order to reduce the electrical resistance of the total circuit.

Figure 15:
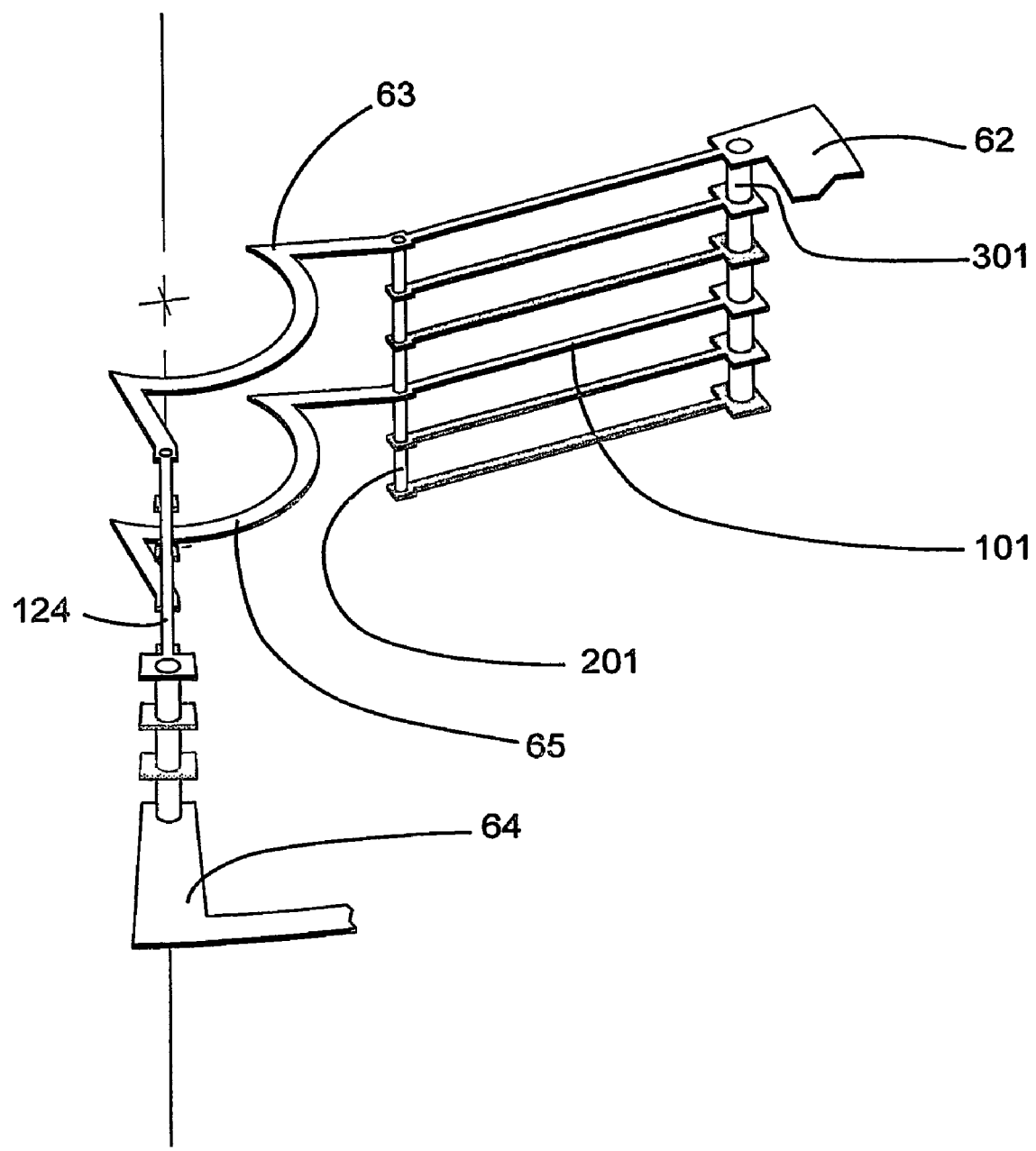
FIG. 15 is a detail view showing radial conductors of six conductor layers connected in parallel according to the present invention.

Another method of reducing the total electrical resistance of a conductor circuit within conductor optimized stator 15 is to connect corresponding conductors that are on different layers of conductive material in parallel. As a nonlimiting example, FIG. 15 illustrates six layers of radial conductor 101 electrically connected in parallel by vias 201 and 301. The total electrical resistance of a number of parallel conductors, each with an electrical resistance value, is equal to one divided by the sum of the reciprocals of resistance value of each conductor. When the conductors each have the same resistance value, such as each of the six layers of radial conductor 101 shown in FIG. 15, the formula can be simplified to be the total resistance equal to the resistance value of one conductor divided by the number of conductors in parallel. For example, if radial conductor 101 of the first layer has a resistance value of 0.006 ohms, and the radial conductor 101 in each of the other five layers has the same resistance value, then the total electrical resistance value of all six layers of radial conductor 101 is equal to 0.006 ohms divided by six conductors or 0.001 ohms. FIG. 15 shows the parallel connection of one set of radial conductors across six layers. FIG. 3 shows the parallel connection of the radial conductors in each sector for the phase A circuit across six layers.

Figure 16:
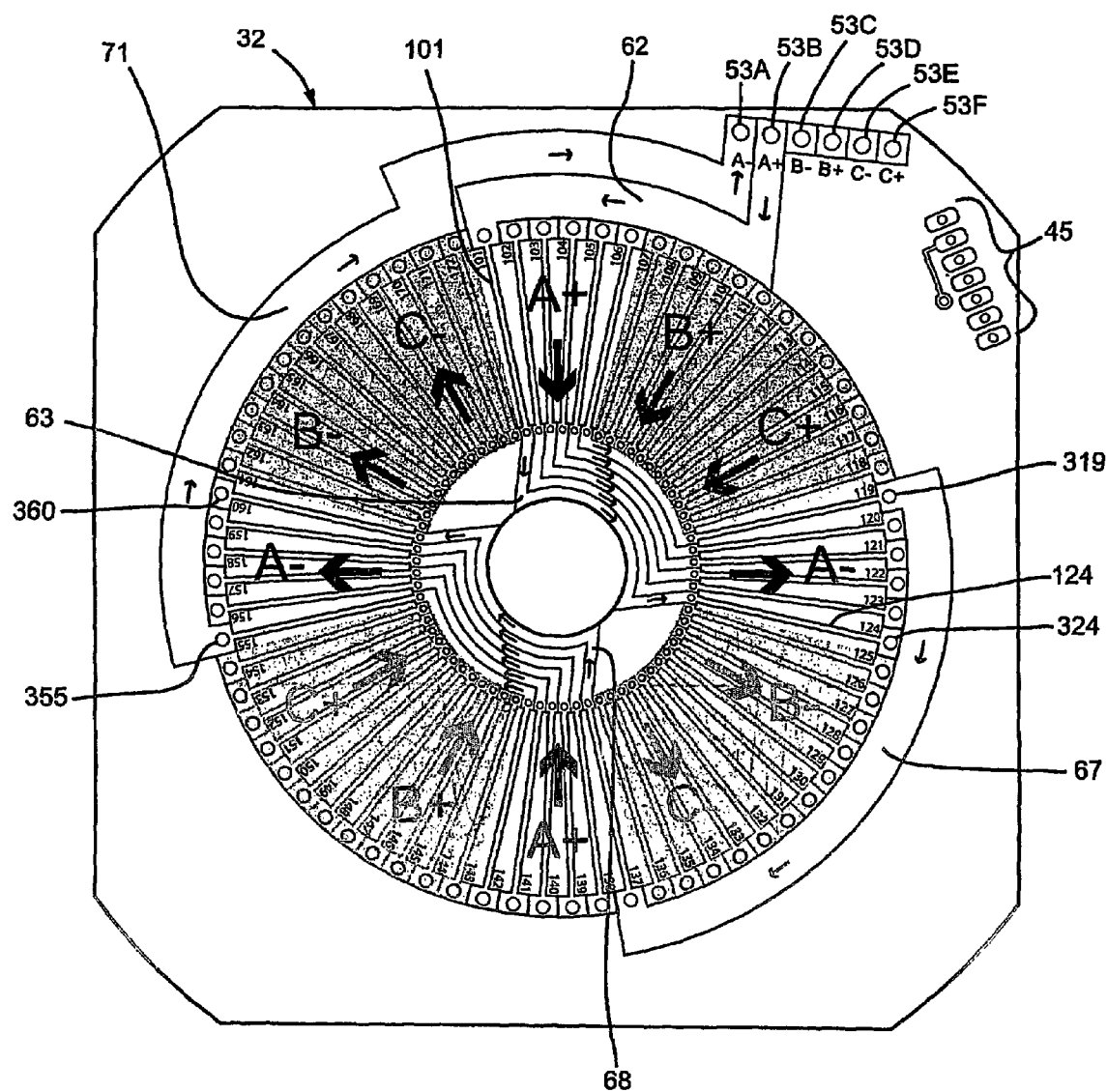
FIG. 16 is a plan view of the first working conductor layer shown in FIG. 6.

As an example of how conductor optimized stator 15 functions, the path of an electric current as it flows through one circuit of the present embodiment when device 10 is driven as a motor will be described. Referring now to FIG. 16, working conductor section 30 of working PCB pattern 32 is comprised of radial conductors 101 to 172. In the currently illustrated preferred embodiment, each phase sector contains six radial conductors that carry an electric current through a phase sector in the same radial direction. Radial conductors 101 to 106 are within a positive phase sector A, radial conductors 107 to 112 are within a positive phase sector B, and working conductors 113 to 118 are within a positive phase sector C. Radial conductors 119 to 124 are within a negative phase sector A, radial conductors 125 to 130 are within a negative phase sector B, and radial conductors 131 to 136 are within a negative phase sector C. Radial conductors 137 to 142 are within a positive phase sector A, radial conductors 143 to 148 are within a positive phase sector B, and radial conductors 149 to 154 are within a positive phase sector C. Radial conductors 155 to 160 are within a negative phase sector A, radial conductors 161 to 166 are within a negative phase sector B, and radial conductors 167 to 172 are within a negative phase sector C. It should be understood that other embodiments with a lower or a higher number of radial conductors in each phase sector may be produced depending upon the desired output requirements of device 10.

Figure 17:
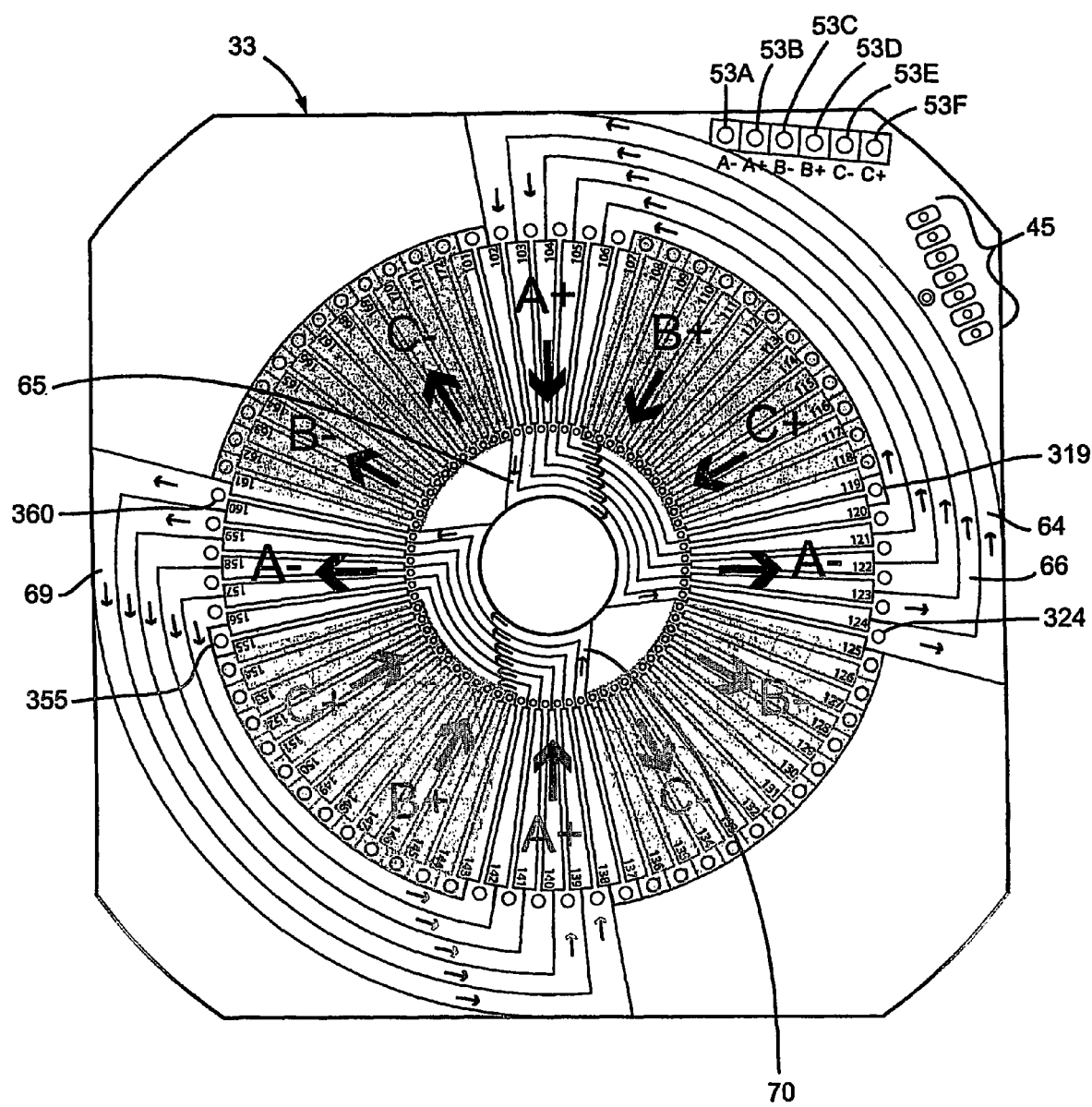
FIG. 17 is a plan view of the first connecting conductor layer shown in FIG. 7 with highlighting.

The radial conductors of each phase sector are connected in series to provide a number of electrical current passes through the working section 30. FIG. 16 shows the previously described working PCB pattern 32 with the phase A circuit highlighted and FIG. 17 shows the connecting electrical conductor PCB pattern 33, also with the phase A circuit highlighted.

In FIG. 16, an electric current is delivered to an A+ terminal 53A from a control means. The control means such as electronic control board 22 previously described, utilizes a sensing means to determine the polarization of the magnetic flux produced by permanent magnets 17A and 17b passing through each phase sector of phase circuits A, B and C. The sensing means is preferably an array Hall sensors surface mounted on conductor optimized stator 15. The control means uses a plurality power transistors or MOSFETS that switch the electric current to phase circuits A, B and C at the proper time and duration to produce and maintain the rotary motion of the device based upon the input of the Hall sensor array. The control means is external to device 10 and the electrical connections between the control means and the conductor optimized stator 15 may be carried by a separate conductor such as a bundle of wires or a ribbon cable.

From the A+ terminal 53A the electric current moves through an outer non-radial conductor 62. The current is led into and through a radial conductor 101 and then into an inner non-radial conductor 63. The inner non-radial conductor 63 leads the current into and through radial conductor 124. From this point the current leaves working PCB pattern 32. The current travels through an outer via 324 to connecting PCB pattern 33 in FIG. 17. From outer via 324, the current travels through an outer non-radial conductor 64 to reach radial conductor 102. The current travels through working conductor 102 to an inner non-radial conductor 65, into radial conductor 123, then to outer non-radial conductor 66 and into radial conductor 103. Each time that the electrical current travels through a radial conductor, the current passes through the working conductor section 30. The electrical current continues the current passes through radial conductors 122, 104, 121, 105, 120, 106, and 119. From radial conductor 119 the current returns through an outer via 319 to working PCB pattern 32 shown in FIG. 16. From outer via 319, the current travels through an outer non-radial conductor 67 and into radial conductor 137. From radial conductor 137, the electrical current travels through an inner non-radial conductor 68 to radial conductor 160. The current must travel through an outer via 360 to connecting PCB pattern 33, again referring to FIG. 17, where the current is then able to flow through an outer non-radial conductor 69 to radial conductor 138. The electric current flows from radial conductor 138 into inner non-radial conductor 70 and then flows into radial conductor 159. The current continues the current passes through radial conductors 139, 158, 140, 157, 141, 156, 142 and 155. From radial conductor 155, the current is led through an outer via 355 to the working PCB pattern 32 as shown in FIG. 16. From outer via 355 the current travels through outer non-radial conductor 71 to an A− terminal 53B. From the A− terminal 53B the current is delivered back to the control means. In similar fashion, working pattern 34 is connected to terminals 53B and 53C and electric current flows through the phase B circuit, included in working PCB pattern 34 and connecting PCB pattern 35, as shown in FIGS. 8 and 9. Also, working pattern 36 is connected to terminals 53C and 53D and electric current flows through the phase C circuit, included in working PCB pattern 36 and connecting PCB pattern 37, as shown in FIGS. 10 and 11. As previously shown and described in FIG. 15, outer via 301 and inner via 201 connect radial conductors 101 on each layer of conductive material included in the PCB patterns 32, 33, 34, 35, 36, and 37 in parallel. Similarly, radial conductors 102 to 172 shown in FIGS. 16 and 17 are connected in parallel to the corresponding radial conductors on each layer of conductor material within conductor optimized stator 15 by outer vias 302 to 372 and by inner vias 202 to 272.

Figure 18:
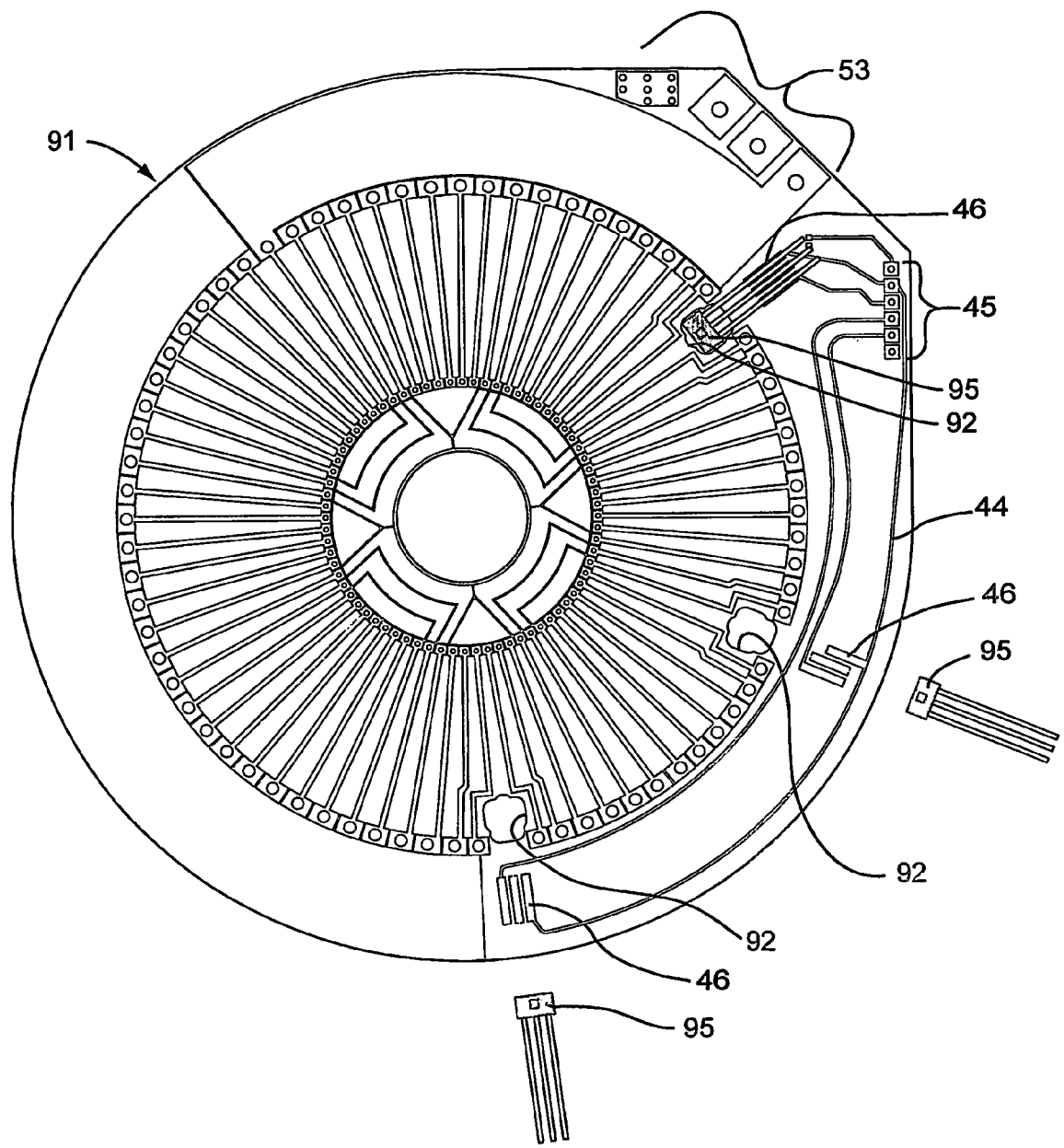
FIG. 18 is a plan view of a conductor layer according to a second embodiment of the present invention.

Another embodiment of the invention is shown in FIG. 18. The embodiment includes a PCB pattern 91 used with stator 15. The differences from the previously described embodiment include a means to position magnetic pole sensors, such as Hall sensors 95, within working section 30. Pattern 91 comprises sensor pockets 92. Sensor pockets 92 are vacant areas that extend through all layers of conductive and nonconductive material. Sensor pockets 92 are sized and positioned to allow a magnetic pole sensor to be placed within the concentrated magnetic flux between magnets 17a and 17b. The radial conductors near sensor pockets 92 are patterned to provide adequate clearance and maintain connections within the circuits of conductor optimized stator 15.

Figure 19:
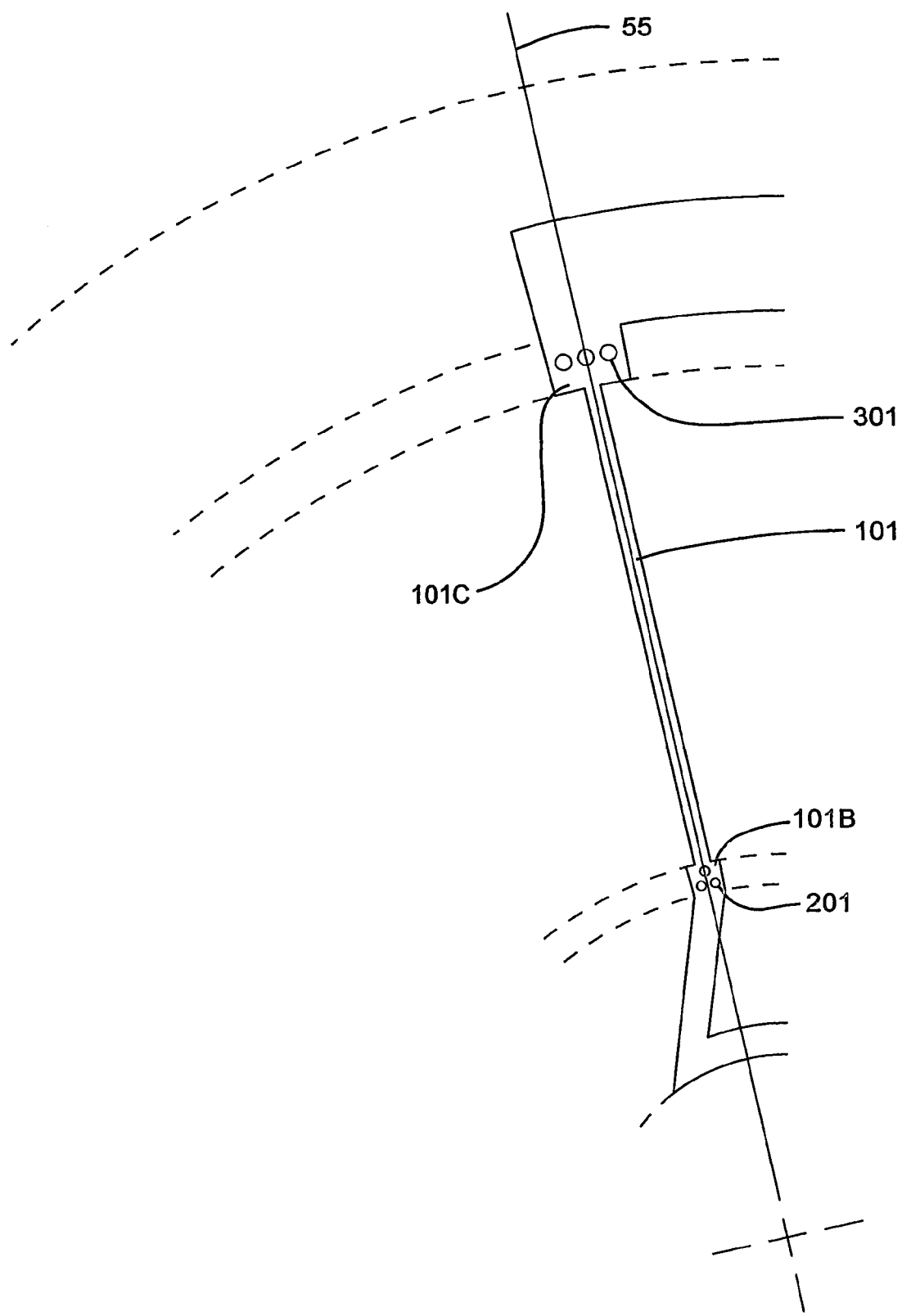
FIG. 19 is a detail vew of a radial conductor used with the conductor layers according to a third embodiment of the present invention.

The invention provides for other embodiments that optimize the conductors of conductor optimized stator 15 in addition to those mentioned above. As previously shown, FIG. 15 illustrates one configuration of radial conductor 101, that being comprised of a single, straight working conductor 101a, symmetrical about a radius 55 along with inner via pad 101b, inner via 201, outer via pad 101c, and outer via 301. As non-limiting examples, FIGS. 19–24 show other possible means to optimize the conductors of the invention. FIG. 19 shows a radial conductor 101 as described above that comprises three vias 201 in inner pad 101b and three vias 301 in outer pad 101c. Increasing the number vias connecting radial conductor 101 on each layer of conductive material increases the total plated area of each connection which reduces the electrical resistance of the circuit. Although three vias 201 and three vias 301 are shown, it is understood that other numbers of vias are possible.

Figure 20:
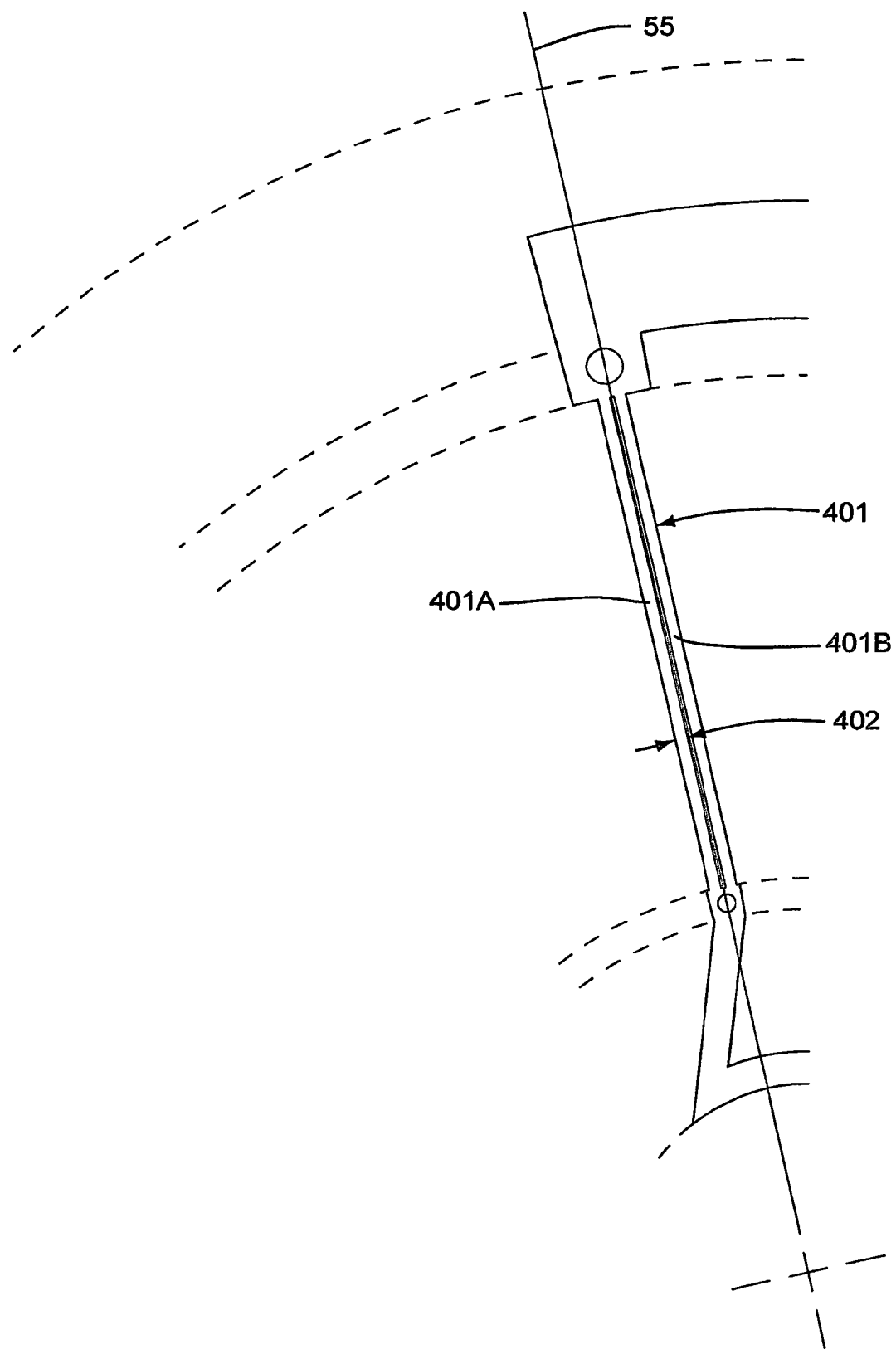
FIG. 20 is a detail view of a radial conductor used with the conductor layers according to a fourth embodiment of the present invention.

Another embodiment shown in FIG. 20 shows a radial conductor 401 that is comprised of two working conductors 401a and 401b. Working conductors 401a and 401b are parallel to radius 55 and are of equal width 402. Radial conductor 401 is shown with two working conductors. However, other numbers of working conductors may be used. The width of each individual working conductor is minimized to help reduce eddy current losses. Having a number of working conductors in parallel, such as working conductors 401a and 401b, reduces the electrical resistance and improves the transfer of heat outward when compared to a single working conductor.

Figure 21:
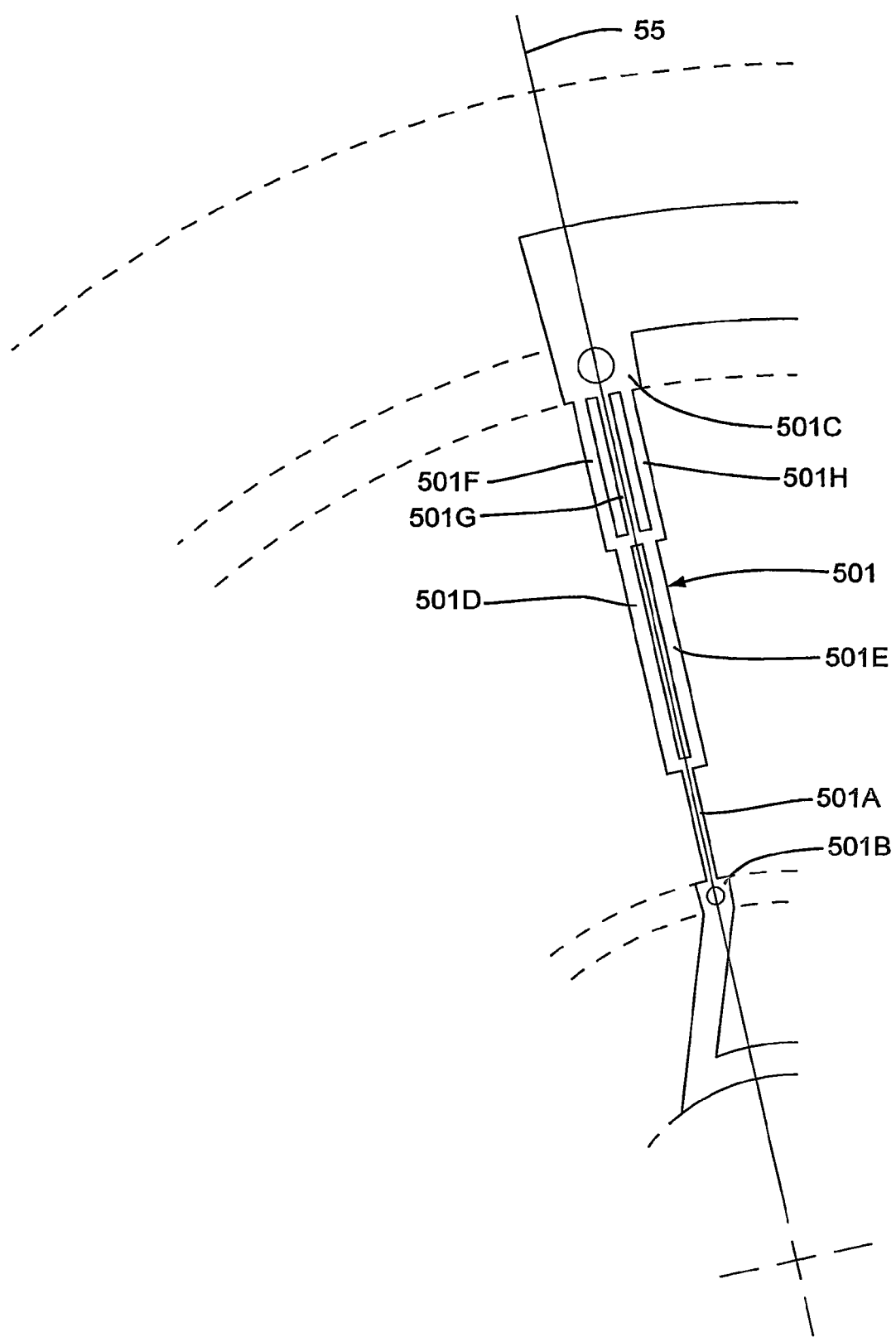
FIG. 21 is a detail view of a radial conductor used with the conductor layers according to a fifth embodiment of the present invention.

FIG. 21 illustrates another possible embodiment of a radial conductor within the invention. Branching conductor 501 is shown as working conductor 501a continuous with inner pad 501b. Radially outward, working conductor 501a branches into working conductors 501d and 501e, and further on branches again into working conductors 501f, 501g, and 501h. Branching conductor 501 is another method to reduce eddy current losses, reduce resistance, and increase the transfer of heat to the outer edges of conductor optimized stator 15.

Figure 22:
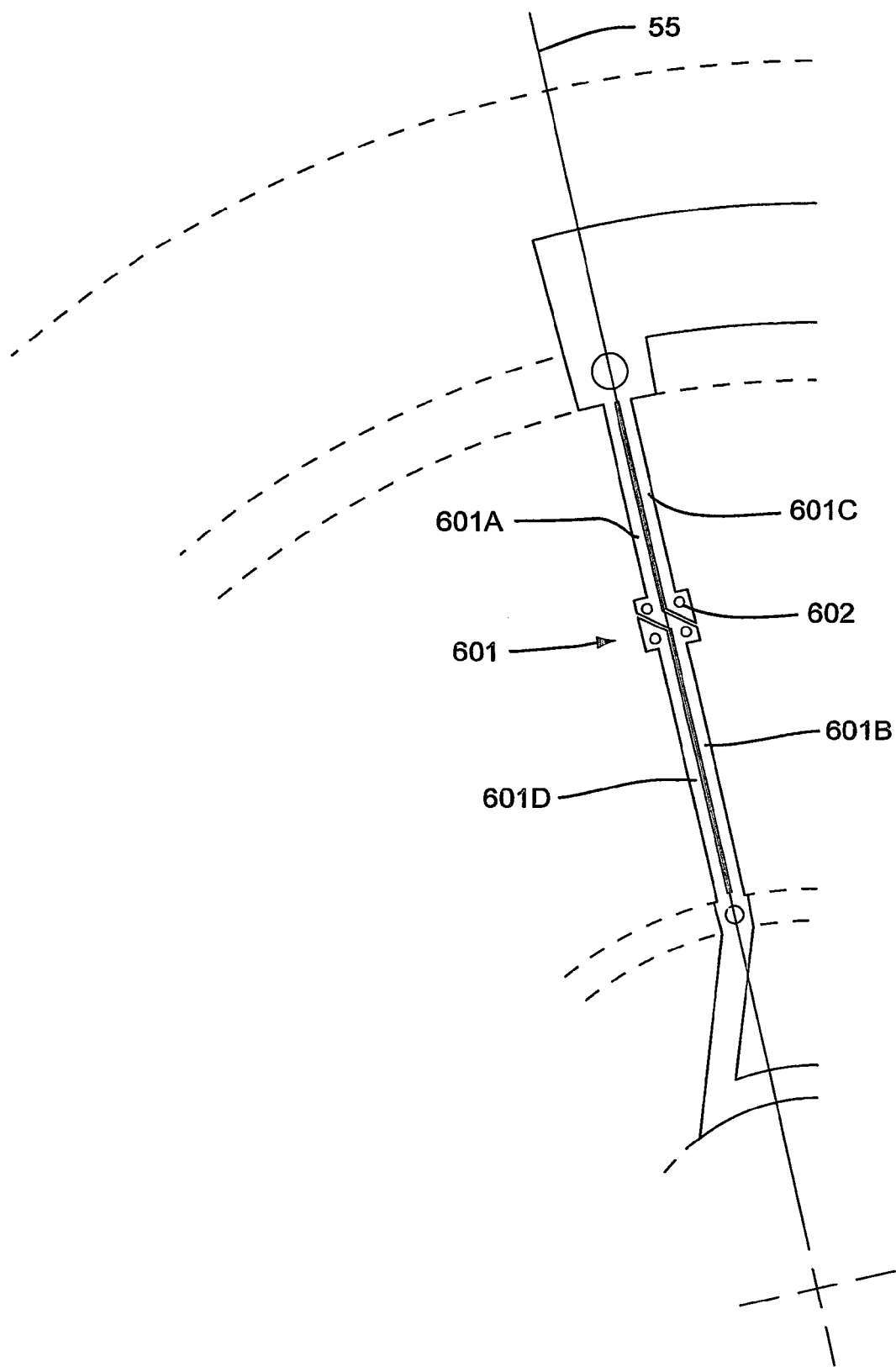
FIG. 22 is a detail view of a radial conductor used with the conductor layers according to a sixth embodiment of the present invention.
Figure 23:
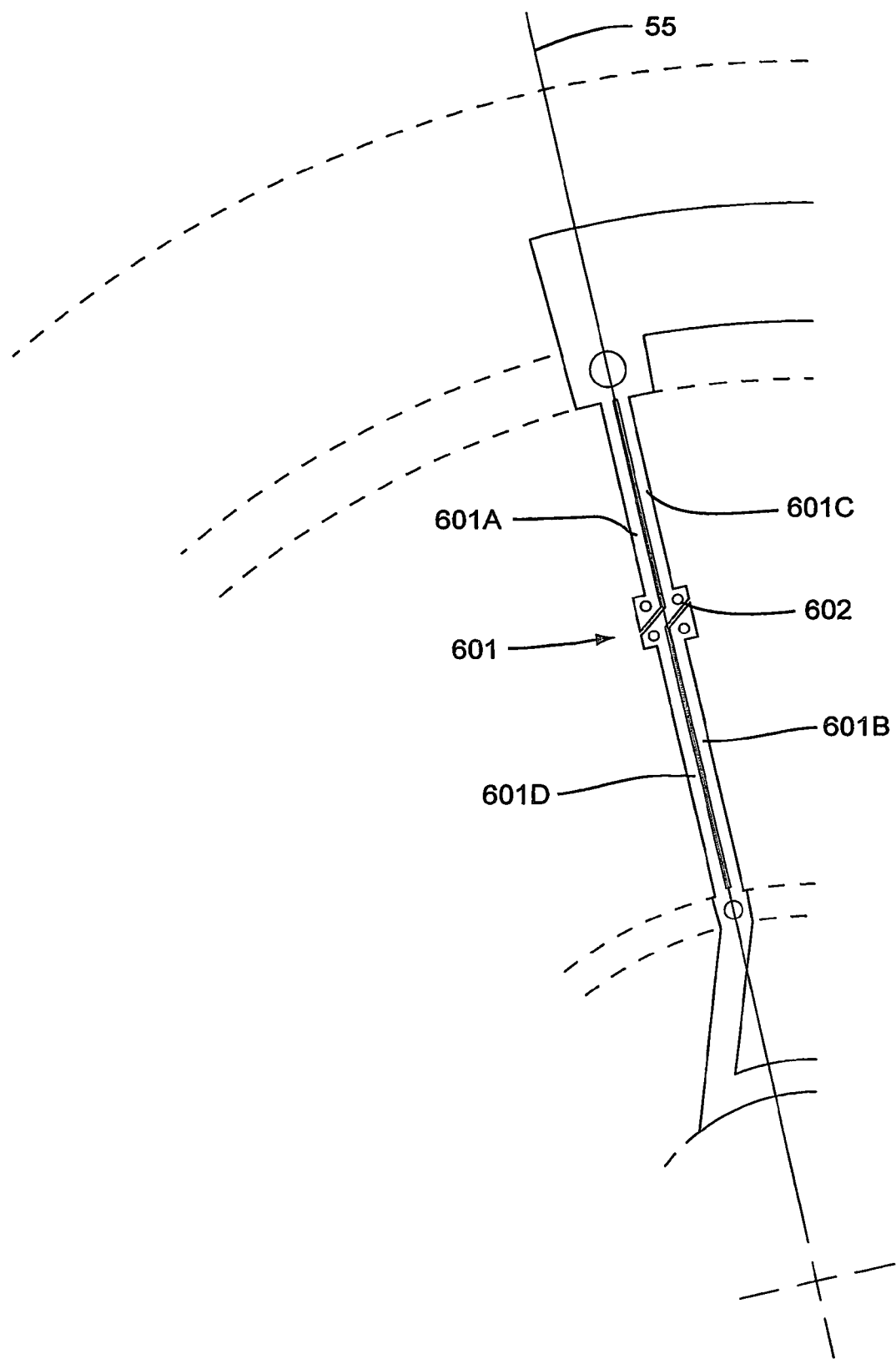
FIG. 23 is a detail view of a radial conductor used with the conductor layers according to a seventh embodiment of the present invention.

In FIGS. 22 and 23, a plurality of vias 602 in working section 30 cross of a pair of working conductors from one side of radius 55 to the other. In FIG. 22, radial conductor 601 is comprised of working conductors 601a, 601b, 601c and 601d. Working conductors 601a and 601b are continuous as shown and working conductors 601c and 601d end at vias 602 as shown. An electrical current moving through working conductor 601a is on one side of radius 55 and then is crossed to the other side of radius 55 in working conductor 601b. Electric current traveling in 601c is connected to another layer of conductive material by via 602 which is configured as illustrated in FIG. 23. The electric current moves from via 602 into working conductor 601c and then is moved across radius 55 to working conductor 601d. On the layer of conductive material illustrated in FIG. 23, working conductors 601a and 601b end at vias 602. An electric current traveling through working conductor 601a is connected to the layer of conductive material shown in FIG. 22 where it is connected to working conductor 601a and then is moved across radius 55 to working conductor 601b. Crossing the working conductors in the manner just described is a method of reducing loop currents that are induced within parallel conductors in an alternating magnetic field.

Figure 24:
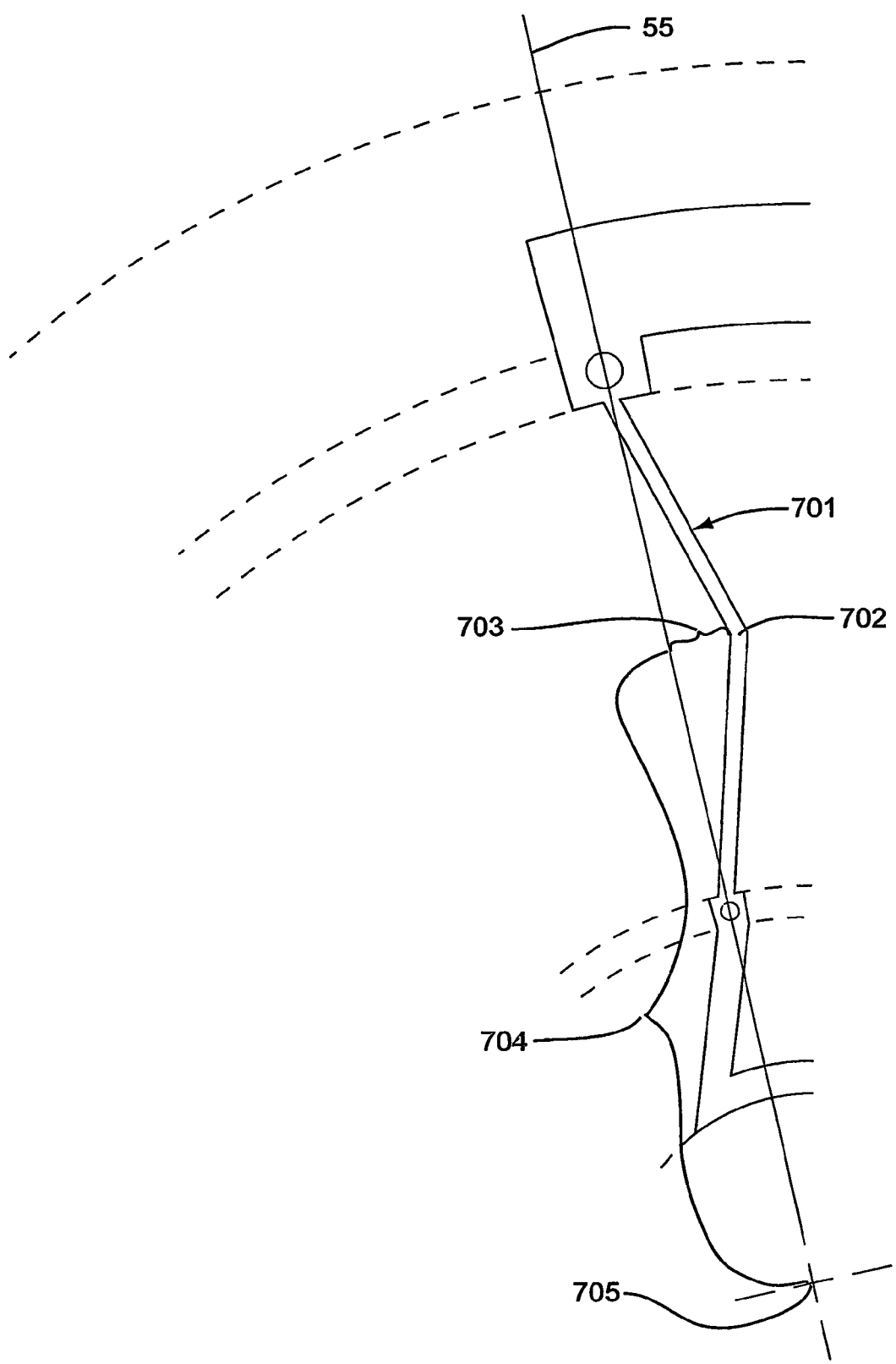
FIG. 24 is a detail view of a radial conductor used with the conductor layers according to an eighth embodiment of the present invention.

FIG. 24 illustrates another embodiment with radial conductor 701 which is comprised of a midpoint 702 that is a distance 703 from radius 55 and a distance 704 from the center 705 of optimized conductor stator 15. Midpoint 702 can have the same or different values for distance 703 and 704 on different layers of conductive material within conductor optimized stator 15. Bending radial conductor 701 away from radius 55 in the manner just described is a method of reducing cogging.

The different configurations of radial conductors illustrated in FIGS. 14 and 15 and in FIGS. 19–24 are presented as non-limiting examples and it will be understood that many other configurations that will further optimize the conductors are possible.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims:

We claim:

1. An axial field rotary energy device having positive and negative polarity, multi-phase electric current terminals comprising:
   a rotor having a plurality of permanent magnet poles; and
   a stator having:
      a plurality of circuit board working conductor layers having at least one working conductor layer for each phase of the electric current, each of said working conductor layers including a pattern of a plurality of radial conductors running between an inner through-hole and an outer through-hole, said inner through-holes being located at an inner diameter of said working conductor layer and said outer through-holes being located at an outer diameter of said working conductor layer;
      each working layer further having a pair of outer conductors for electrically connecting the positive and negative terminals of one phase of the electric current to selected outer through-holes and a plurality of inner conductors for electrically connecting selected inner through-holes together;

a plurality of circuit board connecting conductor layers, at least one of which is associated with each working conductor layer, and each one including a pattern of a plurality of radial conductors running between an inner through-hole and an outer through-hole, said inner through-holes being located at an inner diameter of said connecting conductor layer and said outer through-holes being located at an outer diameter of said connecting conductor layer;

each connecting layer further having a plurality of outer conductors for electrically connecting selected outer through-holes together and a plurality of inner connectors for electrically connecting selected inner through-holes together; and a plurality of via conductors, positioned within selected inner and outer through-holes of the working conductor layer and connecting layers, for electrically connecting selected ones of the radial connectors of the connecting conductor layer to selected ones of the radial connectors of the working conductor layer.

2. The rotary energy device according to claim 1 wherein each circuit board working conductor layer has a planar configuration and each circuit board connecting conductor layer has a planar configuration and the stator is formed by stacking the working conductor layers and the connecting conductor layers one upon the other with a substrate layer in between each layer.

3. The rotary energy device according to claim 2 wherein the stator has a central bore therethrough in a direction perpendicular to the planar configuration of the layers and further including a rotatable drive shaft extending through the central bore and further including a first rotor fixedly secured to the drive shaft on one side of the stator and a second rotor fixedly secured to the drive shaft on the opposite side of the stator.

4. The rotary energy device according to claim 3 further including a sensing means mounted to the stator for determining the rotational position of the permanent magnet poles.

5. The rotary energy device according to claim 3 wherein the permanent magnet poles of the first rotor are positioned with respect to the permanent magnet poles of the second rotor so that flux lines pass through the stator in a direction perpendicular to the planar configuration of the working conductor layers.

6. The rotary energy device according to claim 3 wherein each rotor has at least four permanent magnet poles.

7. The rotary energy device according to claim 1 configured for at least a three-phase electric circuit.

8. The rotary energy device according to claim 1 wherein the radial conductors of the working conductor layer and the connecting conductor layer have a preselected width and the outer and inner conductors of the working conductor layer and the outer and inner conductors of the connecting conductor layer have a width wider than the preselected width.

9. The rotary energy device according to claim 1 wherein each working conducting layer and each connecting conductor layer is divided into sectors with each sector associated with a positive or negative polarity of each phase of the electric current and with radial conductors running through each sector.

10. The rotary energy device according to claim 9 wherein the inner conductors of each working conductor layer together with the inner and outer conductors of each connecting conductor layer connect the radial connectors in each sector associated with a phase of the electric current together in series through the via conductors.

11. The rotary energy device according to claim 10 wherein the device is configured for at least three-phase electric current and wherein the rotor includes at least four permanent magnet poles and wherein each working conductor layer and each connecting layer is divided into at least twelve sectors and further wherein the working conductor layer includes at least one outer conductor for connecting a sector associated with the negative polarity of a phase to a sector associated with a positive polarity of this phase.

12. The rotary energy device according to claim 10 wherein the radial conductors of each working conductor layer and each connecting conductor layer are arranged in an identical pattern and wherein corresponding radial conductors in each layer are electrically connected in parallel with the via conductors.

* * * * *